US012752615B2

(12) United States Patent
Ioka et al.

(10) Patent No.: US 12,752,615 B2
(45) Date of Patent: Oct. 6, 2026

(54) CABIN STRUCTURE OF VEHICLE

(71) Applicant: MAZDA MOTOR CORPORATION, Hiroshima (JP)

(72) Inventors: Tadashi Ioka, Aki-gun (JP); Yoshio Fukushima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 276 days.

(21) Appl. No.: 18/739,425

(22) Filed: Jun. 11, 2024

(65) Prior Publication Data

US 2025/0010700 A1 Jan. 9, 2025

(30) Foreign Application Priority Data

Jul. 3, 2023 (JP) ................................ 2023-109308
Jul. 3, 2023 (JP) ................................ 2023-109309
(Continued)

(51) Int. Cl.
*B60K 1/04* (2019.01)
*B60H 1/00* (2006.01)
(Continued)

(52) U.S. Cl.
CPC ........... *B60K 1/04* (2013.01); *B60H 1/00028* (2013.01); *B60N 2/20* (2013.01); *B60R 5/00* (2013.01);
(Continued)

(58) Field of Classification Search
CPC .... B60K 2001/0416; B60K 2001/0427; B60K 1/04; B60K 2001/0438; B60K 2001/0405;
(Continued)

(56) References Cited

U.S. PATENT DOCUMENTS

2012/0312610 A1* 12/2012 Kim .................... H01M 10/625 180/65.31
2013/0001988 A1* 1/2013 Lucas ...................... B60N 2/36 296/146.8
(Continued)

FOREIGN PATENT DOCUMENTS

DE 102005028950 A1 * 1/2006 .......... H01M 10/613
JP 2005-071759 A 3/2005
(Continued)

OTHER PUBLICATIONS

DE-102005028950-A1 Translation (Year: 2006).*
(Continued)

*Primary Examiner* — James A Shriver, II
*Assistant Examiner* — Mohammad Omid Neyzari
(74) *Attorney, Agent, or Firm* — Studebaker Brackett PLLC

(57) ABSTRACT

A first battery provided behind seatbacks of rear seats and a second battery provided between the rear seats are arranged in a T-letter shape in a plan view, right-and-left both end portions of the first battery are fixed to a baggage-compartment part of a floor, a front end portion of the second battery extending forward beyond a kick-up portion toward an inside of a front-seat center console is fixed to the floor, and each back face portion of the respective seatbacks of the rear seats which are positioned in a forward-folded state and an upper face portion of the first battery are configured to form a substantially flat and enlarged floor surface of a baggage compartment.

11 Claims, 19 Drawing Sheets

(30) Foreign Application Priority Data

Jul. 3, 2023 (JP) ................................. 2023-109310
Jul. 3, 2023 (JP) ................................. 2023-109311

(51) Int. Cl.

| | |
|---|---|
| ***B60N 2/20*** | (2006.01) |
| ***B60R 5/00*** | (2006.01) |
| ***B60R 7/04*** | (2006.01) |
| ***B62D 25/08*** | (2006.01) |
| ***B62D 25/20*** | (2006.01) |

(52) U.S. Cl.
CPC .............. *B60R 7/04* (2013.01); *B62D 25/088* (2013.01); *B62D 25/20* (2013.01); *B60H 2001/002* (2013.01); *B60K 2001/0438* (2013.01)

(58) Field of Classification Search
CPC ........ B60K 2001/0411; B60H 1/00028; B60H 2001/002; B60N 2/20; B60R 5/00; B60R 7/04; B62D 25/088; B62D 25/20; B62D 25/00; B60Y 2200/11
See application file for complete search history.

(56) References Cited

U.S. PATENT DOCUMENTS

| | | | | | |
|---|---|---|---|---|---|
| 2013/0319780 | A1* | 12/2013 | Nitawaki | ................. | B60K 1/04 180/68.5 |
| 2018/0111499 | A1* | 4/2018 | Wada | ....................... | B60K 1/04 |

FOREIGN PATENT DOCUMENTS

| | | | | | |
|---|---|---|---|---|---|
| JP | 2008-081024 | A | | 4/2008 | |
| JP | 2009-029159 | A | | 2/2009 | |
| JP | 2011195056 | A | * | 10/2011 | ............. B62D 25/20 |
| JP | 2015-107727 | A | | 6/2015 | |
| KR | 20130011414 | A | * | 1/2013 | ............... B60K 1/04 |
| WO | WO-2011055936 | A2 | * | 5/2011 | .............. B60L 50/66 |

OTHER PUBLICATIONS

JP-2011195056-A Translation (Year: 2011).*
KR-20130011414-A Translation (Year: 2013).*
WO-2011055936-A2 Translation (Year: 2011).*

* cited by examiner

CABIN STRUCTURE OF VEHICLE

BACKGROUND OF THE INVENTION

The present invention relates to a cabin structure of a vehicle, comprising a battery for drive which is installed above a floor of the vehicle, such as a hybrid vehicle or an electric automobile.

It is known, as exemplified by Japanese Patent Laid-Open Publication No. 2005-71759, that the battery for drive is arranged above a rear floor in a cabin in the hybrid vehicle, the electric automobile, or the like.

However, this arrangement of the battery for drive above the rear floor causes a floor surface of a baggage compartment in the cabin to be located at a high level improperly, so that there is a problem that the substantial height of a baggage space may be decreased. In a stylishness-oriented vehicle with a relatively low roof height, in particular, this problem may become dominant.

Meanwhile, a structure in which the battery for drive, i.e., the battery case for this battery, is arranged in a space below a seat cushion of a rear seat provided above the floor has been proposed as disclosed in Japanese Patent Laid-Open Publication No. 2009-29159. This structure, however, increases the height of the rear-seat cushion improperly, so that a head clearance of a passenger seated in the rear seat may be deteriorated.

Moreover, even in a case where a seatback of the rear seat is configured to be forward foldable so that the substantially-flat floor surface of the baggage compartment can be enlarged over an arrangement area of the rear seat in the cabin, the above-described layout of the battery (battery case) installed above the floor may hinder this enlargement trial of the flat floor surface of the baggage compartment.

SUMMARY OF THE INVENTION

The present invention has been devised in view of the above-described problems, and an object of the present invention is to provide a cabin structure of a vehicle with the battery for drive provided above the floor which can properly form the substantially-flat and enlarged floor surface of the baggage compartment, ensuring the height of the baggage space and the head clearance of the passenger seated in the rear seat, without deteriorating the battery volume, in a forward-folded state of the seatback of the rear seat.

Another object of the present invention is to provide the cabin structure of the vehicle which can properly ensure the essential function of a center console even if the battery (case) is expanded and enlarged forward.

Further another object of the present invention is to provide the cabin structure of the vehicle which can properly make the battery case storing the battery for drive contribute to improvement of the vehicle-body rigidity.

The present invention is a cabin structure of a vehicle, which is provided with a floor forming a bottom face of a cabin, right-and-left front seats arranged to be laterally separated above a front part of the floor, a front-seat center console interposed between the right-and-left front seats, right-and-left rear seats arranged to be laterally separated above a rear part of the floor behind a kick-up portion and configured to be forward foldable, and a rear-seat center console interposed between the right-and-left rear seats, comprising a first battery for drive provided above a baggage-compartment part of the floor behind seatbacks of the rear seats and extending in a vehicle width direction and a second battery for drive provided above a part of the floor between the right-and-left rear seats and extending in a vehicle longitudinal direction, wherein the first and second batteries are arranged in a T-letter shape in a plan view, right-and-left both end portions of the first battery are fixed to the baggage-compartment part of the floor, a front end portion of the second battery extending forward beyond the kick-up portion toward an inside of the front-seat center console is fixed to the floor, and each back face portion of the respective seatbacks of the right-and-rear rear seats which are positioned in a forward-folded state and an upper face portion of the first battery are configured to form a substantially flat and enlarged floor surface of a baggage compartment.

According to the present invention, the sufficient battery volume, the height of the baggage space, and the head clearance of the passenger seated in the rear seat can be ensured, and also the substantially-flat floor surface of the baggage compartment can be properly enlarged in the forward-folded state of the seatbacks of the right-and-left rear seats.

In an embodiment of the present invention, the cabin structure of the vehicle further comprises a middle seatback portion provided between the right-and-left rear seats so as to be forward folded onto an upper face of the rear-seat center console, wherein longitudinal thickness of the middle seatback portion in an upright position is configured to be smaller than that of each of the seatbacks of the right-and-left rear seats in the upright position such that a back face portion of the middle seatback portion positioned in a forward-folded state and each back face portion of the respective seatbacks of the right-and-left rear seats positioned in the forward-folded state form a flat surface extending in the vehicle width direction.

According to this embodiment, since the back face portion of the middle seatback portion positioned in the forward-folded state and each back face portion of the respective seatbacks of the right-and-left rear seats positioned in the forward-folded state form the flat surface extending in the vehicle width direction, flatness of the floor surface of the baggage compartment can be improved.

In another embodiment of the present invention, an upper portion of the rear-seat center console is provided with a seatback placement portion where the forward-folded middle seatback portion is received and a protrusion portion which is configured to protrude in front of the seatback placement portion, a function panel to provide an input/output function to a passenger seated in the rear seat is arranged at a portion of the protrusion portion which faces the passenger seated in the rear seat, and the function panel is covered with the middle seatback portion positioned in the forward-folded state.

According to this embodiment, the function panel of the rear-seat center console can be properly protected by a front portion of the forward-folded middle seatback portion against a loaded baggage.

In another embodiment of the present invention, a rear portion of the front-seat center console and the front end portion of the second battery are fixed to a central portion, in the vehicle width direction, of the floor by a common attaching member.

According to this embodiment, attachment portions of the console's rear portion and the battery's front portion can be compact, so that erosion of respective volumes of the both by the attachment portions can be suppressed.

In another embodiment of the present invention, the front-seat center console comprises an object storage portion which opens upward and an air-conditioning discharge port for the rear seat which is arranged behind the object storage portion, the front end portion of the second battery is positioned close to a rear end portion of the object storage portion, and the air-conditioning discharge port is positioned above the front end portion of the second battery.

According to this embodiment, the air-conditioning discharge port for the rear seat can be located at an appropriate level for the rear seat's passenger, and also the second battery can be extended to the rear end portion of the object storage portion without being hindered by the air-conditioning discharge port, thereby increasing the battery volume properly.

In another embodiment of the present invention, a duct to introduce conditioning air from an air-conditioning unit provided at a front part of the cabin to the air-conditioning discharge port for the rear seat is arranged inside the front-seat center console, the object storage portion is formed in a cuboid shape with a bottom, which includes a bottom face portion and right-and-left side wall portions, and the duct is configured to extend from below the object storage portion to the air-conditioning discharge port for the rear seat, passing through a space between a side face portion of the front-seat center console and the side wall portion of the object storage portion.

According to this embodiment, since the battery for the drive can be made close to the rear end portion of the object storage portion without being hindered by the duct, thereby increasing the battery volume properly.

In another embodiment of the present invention, the cabin structure of the vehicle further comprises an aluminum-made battery case in which a case rear portion to store the first battery and a case front portion to store the second battery are integrally formed substantially in the T-letter shape in the plan view, wherein the case rear portion is fixed to a pair of right-and-left high-rigidity vehicle-body portions which are located in back of the right-and-left rear seats, and the case front portion is fixed to another pair of right-and-left high-rigidity vehicle-body portions which are located in front of the seatbacks of the right-and-left rear seats.

According to this embodiment, since the battery case can be made to function as a frame member to reinforce the vehicle body, so that the bending and/or torsional rigidity of the vehicle body can be improved.

In another embodiment of the present invention, both end portions, in the vehicle width direction, of the case rear portion of the battery case are fixed to right-and-left rear side frames of the vehicle.

According to this embodiment, since the case rear portion of the battery case is fixed to the rear side frame as an existing high-rigidity member, no additional high-rigidity portion extending in the vehicle with direction is necessary in the baggage compartment. Further, since the right-and-left rear side frames where a load is easily inputted from a rear wheel are interconnected, in the vehicle width direction, by the case rear portion of the battery case, torsional deformation of vehicle body which is caused by the input load from the rear wheel can be suppressed.

In another embodiment of the present invention, the cabin structure of the vehicle further comprises right-and-left damper support portions to support respective upper ends of right-and-left rear-suspension dampers, wherein the both end portions, in the vehicle width direction, of the case rear portion of the battery case are fixed to the right-and-left damper support portions.

According to this embodiment, since the damper support portions where the input load from the rear wheel is directly applied is interconnected, in the vehicle width direction, by the case rear portion of the battery case, the torsional deformation of vehicle body caused by the input load from the rear wheel can be suppressed.

In another embodiment of the present invention, the floor is provided with a floor tunnel protruding upward and extending in the vehicle longitudinal direction substantially at a center, in the vehicle width direction, of the floor, and a front end portion of the case front portion of the battery case is fixed to a high-rigidity portion of the floor.

According to this embodiment, since the front-and-rear end portions of the battery case are fixed to the high-rigidity members of the vehicle body which are separated from each other in the vehicle longitudinal direction, the bending rigidity of the vehicle in a side view can be improved.

The present invention will become apparent from the following description which refers to the accompanying drawings.

DETAILED DESCRIPTION OF THE INVENTION

Figure 1:
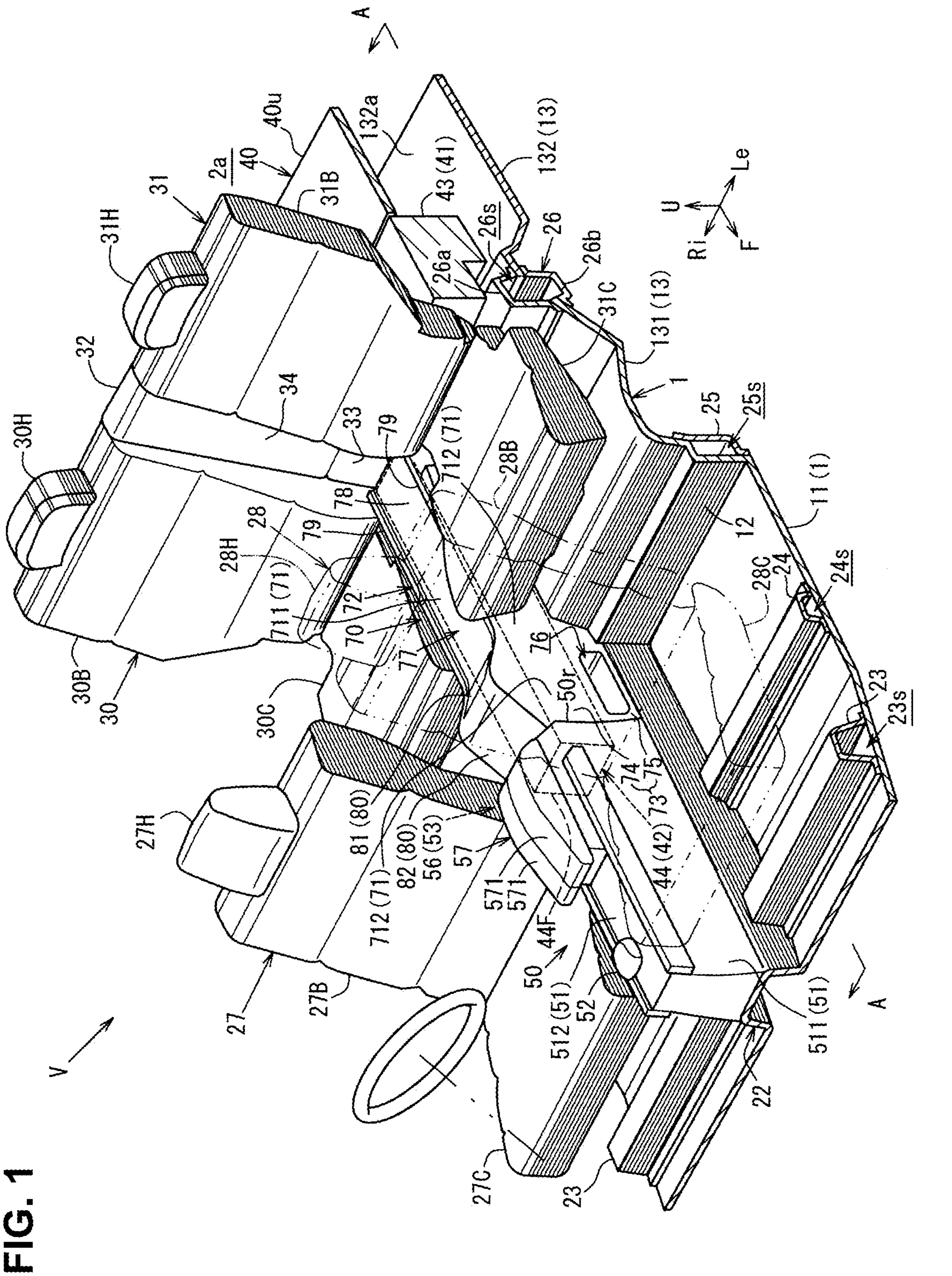
FIG. 1 is a perspective sectional view of a main part of a vehicle of the present embodiment, when viewed from a front, left and upper side of the vehicle.

Hereafter, an embodiment of the present invention will be described specifically referring to the drawings. In the drawings, an arrow F shows a front (forward) side of a vehicle V, and an arrow U shows an upper (upward) side of the vehicle V, an arrow Ri shows a right (rightward) side of the vehicle V, and an arrow Le shows a left (leftward) side of the vehicle V. Basically, in the flowing description, "front (forward)," "rear (rearward)," "right (rightward)," "left (leftward)," "upper (upward)," and "lower (downward)" show respective directions relative to a position of the vehicle V except for particularly-referred cases.

The vehicle V of the present embodiment is, for example, a plug-in hybrid electric vehicle (PHEV), which is capable of charging a battery from a home (household) power source, among various types of hybrid vehicle which can produce a driving power by combining an internal combustion engine and an electric motor.

(Basic Structure)

Figure 4:
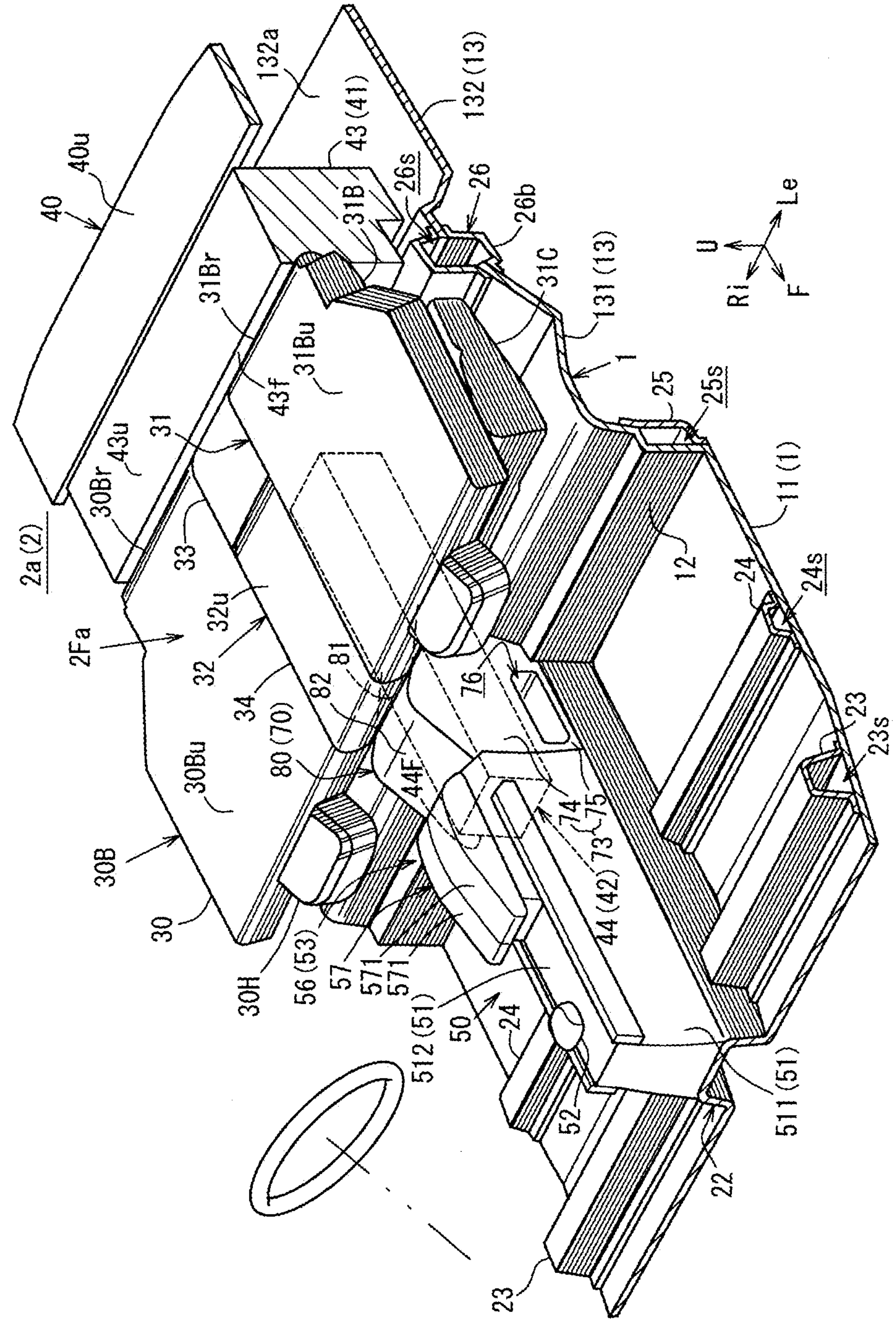
FIG. 4 is a perspective sectional view of the main part of the vehicle shown in FIG. 1 in a state where seatbacks of rear seats and a middle seatback portion are all forward folded.
Figure 5:
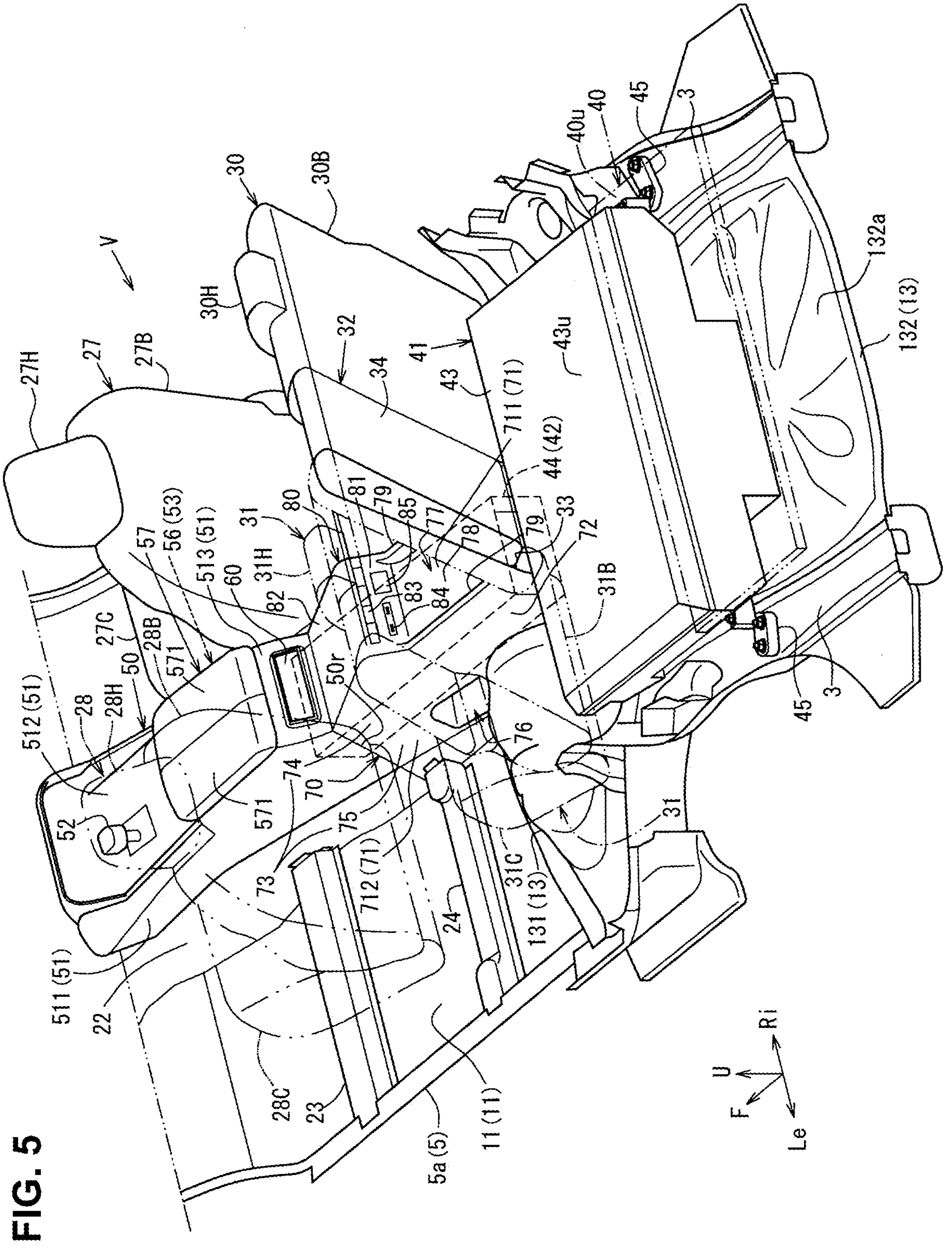
FIG. 5 is a perspective view of the main part of the vehicle of the present embodiment, when viewed from a rear, left and upper side of the vehicle.
Figure 6:
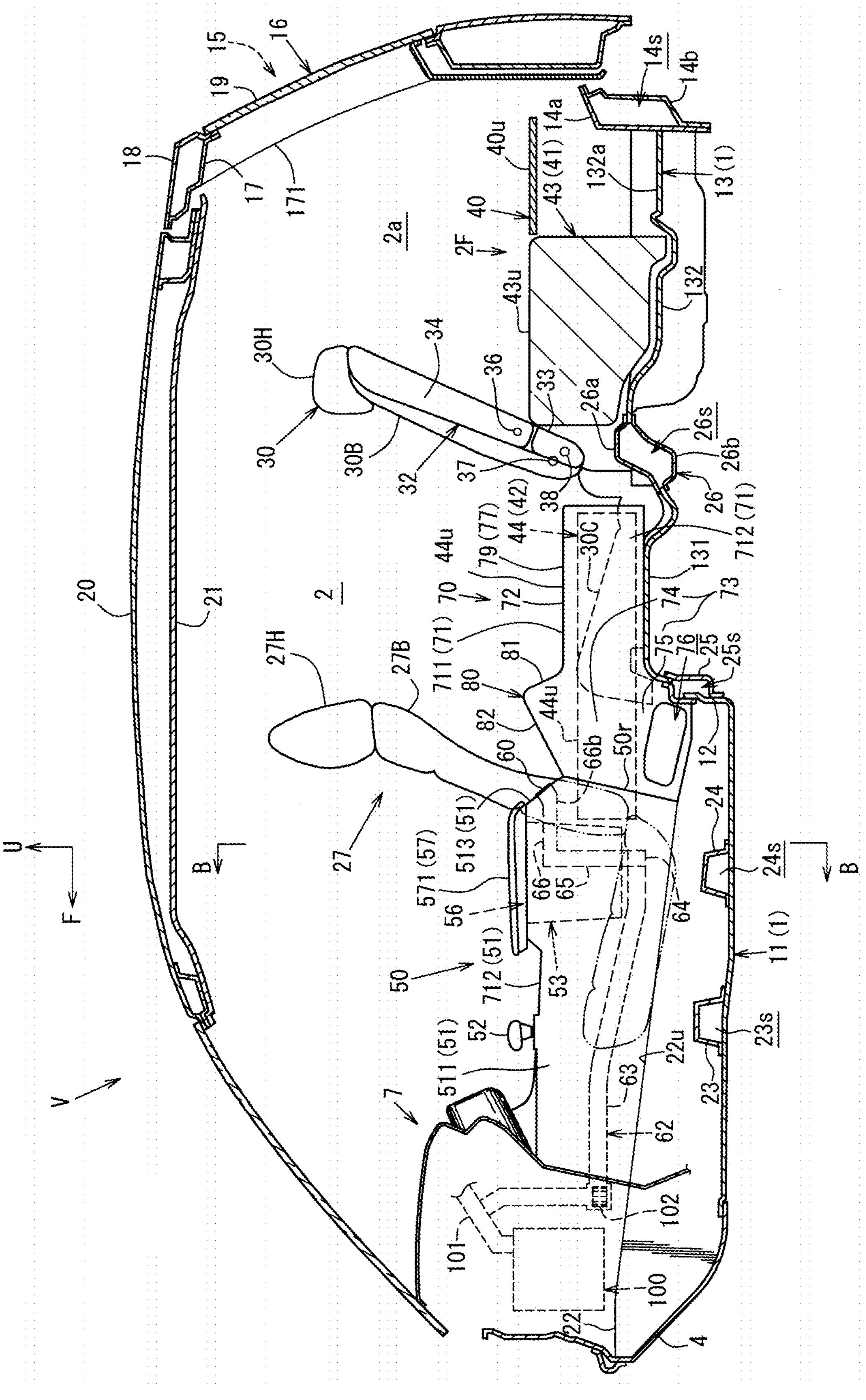
FIG. 6 is a sectional view taken along line A-A of FIG. 1.

As shown in FIGS. 1-6, especially FIGS. 5 and 6, the vehicle V of the present embodiment comprises a steel-made floor panel 1 which mainly forms a floor surface (bottom face) of a cabin 2, a pair of right-and-left front seats 27, 28, and a pair of right-and-left rear seats 30, 31.

The floor panel 1 is integrally formed by a front floor panel 11 which supports the pair of front seats 27, 28, a kick-up portion 12 which rises upward from a rear end of the front floor panel 11 and is of a vertical-wall shape, and a rear floor panel 13 which extends rearward from the kick-up portion 12.

The rear floor panel 13 is integrally formed by a rear-seat cushion panel 131 (rear-seat pan) which supports respective seat cushions 30C, 31C of the rear seats 30, 31 and a baggage-compartment floor panel 132 which extends rearward from the rear-seat cushion panel 131 and forms a floor surface of a baggage compartment 2*a*.

Herein, the baggage-compartment floor panel 132 is provided with a recess portion 132*a* to store a spare tire at a rear-side portion of a central part, in a vehicle width direction, thereof, and a rear end panel 14*a* (see FIG. 6) extending in the vehicle width direction is attached to a rear-end open side of the recess portion 132*a*. Further, a floor surface of another part of the floor panel 1 than the baggage compartment 2*a* in the cabin 2 (i.e., the floor surface of the part of the floor panel 1 where a passenger stays, which is located in front of the baggage compartment 2*a*) is formed by the front floor panel 11, the kick-up portion 12 and the rear-seat cushion panel 131.

As shown in FIG. 6, a rear end member 14*b* extending in the vehicle width direction is fixedly connected to a rear face of the rear end panel 14*a*, and a rear-end closed-cross section 14*s* extending in the vehicle width direction is formed between the rear end member 14*b* and the rear end panel 14*a*, thereby ensuring the rear vehicle-body rigidity.

Further, as shown in FIG. 6, the vehicle V of the present embodiment is a hatch-back type, in which a rear-gate opening 15 which is configured to open rearward is provided at the vehicle rear part, and a rear gate 16 is provided so as to open and close this rear-gate opening 15.

The rear gate 16 comprises a rear-gate inner panel 17, a rear-gate outer panel 18, and a rear window 19, and the rear-gate inner panel 17 is covered with a rear-gate trim 171 which is an interior member from the side of the cabin 2.

Further, the vehicle V comprises a steel-made roof panel 20 as a vehicle roof, and the roof panel 20 is covered with a roof trim 21 which is another interior member from the side of the cabin 2. The height size of the cabin 2 including the baggage compartment 2*a*, except for the front part, is determined by the roof trim 21, the rear-gate trim 171, the rear window 19, and others.

As shown in FIGS. 1, 5 and 6, the front floor panel 11 is provided with a tunnel portion 22 which extends in a longitudinal direction between a dash lower panel 4 (dash panel) (see FIG. 6) and the vertical-wall shaped kick-up portion 12 and protrudes toward an inside of the cabin 2.

The tunnel portion 22, which provides the vehicle-body rigidity mainly, is joined to the kick-up portion 12 at its rear end portion. Herein, the kick-up portion 12 is formed in a vertical-wall shape which is higher than the rear end portion of the tunnel portion 22.

A plurality of cross members 23, 24 (vehicle-body rigidity member) which are spaced apart from each other in the longitudinal direction are joined to the tunnel portion 22 of the front floor panel 11 from above on the both sides of the tunnel portion 22. The cross members 23, 24 extend in the vehicle width direction and interconnect right-and-left vertical wall portions of the tunnel portion 22 and right-and-left side sills 5 (specifically side sill inners 5*a*) (the left-side one is only illustrated in FIG. 5) as a vehicle-body rigidity member, and, as shown in FIGS. 1 and 6, form closed-cross sections 23*s*, 24*s* extending in the vehicle width direction between the floor panel 11 and those.

As shown in FIGS. 1 and 6, plural rear cross members 25, 26 (vehicle-body rigidity members) spaced apart from each other in the longitudinal direction are joined to the rear floor panel 13. The front-end rear cross member 25 (No. 3 cross member) is joined to a front end portion of the rear floor panel 13 (i.e., a front end portion of the rear-seat cushion panel 13) from below and joined to the kick-up portion 12 from behind, and forms a closed-cross section 25*s* extending in the vehicle width direction between that and a corner portion of the rear floor panel 13 and the kick-up portion 12.

The middle rear cross member 26 (No. 4 cross member) comprises a middle rear cross member upper 26*a* which faces the rear floor panel 13 on upper-and-lower both sides and has a hat-shaped cross section opening downward and a middle rear cross member lower 26*b* which faces the rear floor panel 13 on the upper-and-lower both sides and has a hat-shaped cross section opening upward.

The middle rear cross member upper 26*a* and the middle rear cross member lower 26*b* joined together such that a rear end of the rear-seat cushion panel 131 is interposed therebetween at their rear-end flange portions, and also joined together such that a front end of the baggage-compartment floor panel 132 is interposed therebetween, thereby forming a closed-cross section 26*s* extending in the vehicle width direction therebetween.

The driver's seat 27 (the right-side front seat 27 in the present embodiment) among the above-described pair of right-and-left front seats 27, 28 comprises a seat cushion 27C which forms a sitting face for a passenger (driver), a seatback 27B which extends upward from a rear end portion of the seat cushion 27C and forms a face to receive a passenger's back portion, and a headrest 27H which is provided at an upper part of the seatback 27B to support a passenger's head portion.

Likewise, as shown in FIGS. 1 and 5, the assistant seat 28 (the left-side front seat 28 in the present embodiment) among the pair of right-and-left front seats 27, 28 comprises a seat cushion 28C which forms a sitting face for a passenger (assistant), a seatback 28B which extends upward from a rear end portion of the seat cushion 28C and forms a face to receive a passenger's back portion, and a headrest 28H which is provided at an upper part of the seatback 28B to support a passenger's head portion.

Further, as shown in FIGS. 1-6, a front-seat center console portion 50 is arranged between the driver's seat 27 and the assistant seat 28, i.e., at a middle part, in the vehicle width direction, of a vehicle body, such that it is interposed between the seat cushions 27C, 28C of the right-and-left front seats 27, 28. The front-seat center console portion 50 will be described specifically later.

As shown in FIGS. 1 and 5, the pair of rear seats 30, 31 are arranged behind the pair of front seats 27, 28, and provided above the rear-seat cushion panel 131. The rear seats 30, 31 comprise seat cushions 30C, 31C which form a siting face for each passenger, seatbacks 30B, 31B which extend upward from each rear end portion of the seat cushions 30C, 31C and form a face to receive each passenger's back portion, and headrests 30H, 31H which are provided at each upper part of the seatbacks 30B, 31B to support each passenger's head portion.

Moreover, a rear-seat center console portion 70 is arranged between the right-and-left rear seat 30, 31, i.e., at a middle part, in the vehicle width direction, of the vehicle body, such that it is interposed between the seat cushions 30C, 31C of the right-and-left rear seats 30, 31. A middle seatback portion 32 is provided between the seatbacks 30B, 31B of the rear seats 30, 31, i.e., at the central part, in the vehicle width direction, of the vehicle body.

The right-and-left rear seats 30, 31 are made to be separated from each other in the vehicle width direction by the rear-seat center console portion 70 and the middle seatback portion 32, so that these rear seats 30, 31 are independent from each other. The rear-seat center console portion 70 will be described specifically later.

The middle seatback portion 32 comprises a body portion 33 and a rear-seat armrest 34. The rear-seat armrest 34 is configured to be rotatable relative to the body portion 33 around a support point 36 (armrest support point) shown in FIG. 6 which is provided at a lower part of the armrest 34, that is—the rear-seat armrest 34 is foldable so as to take its forward-folded position and its upright-standing position.

Figure 7:
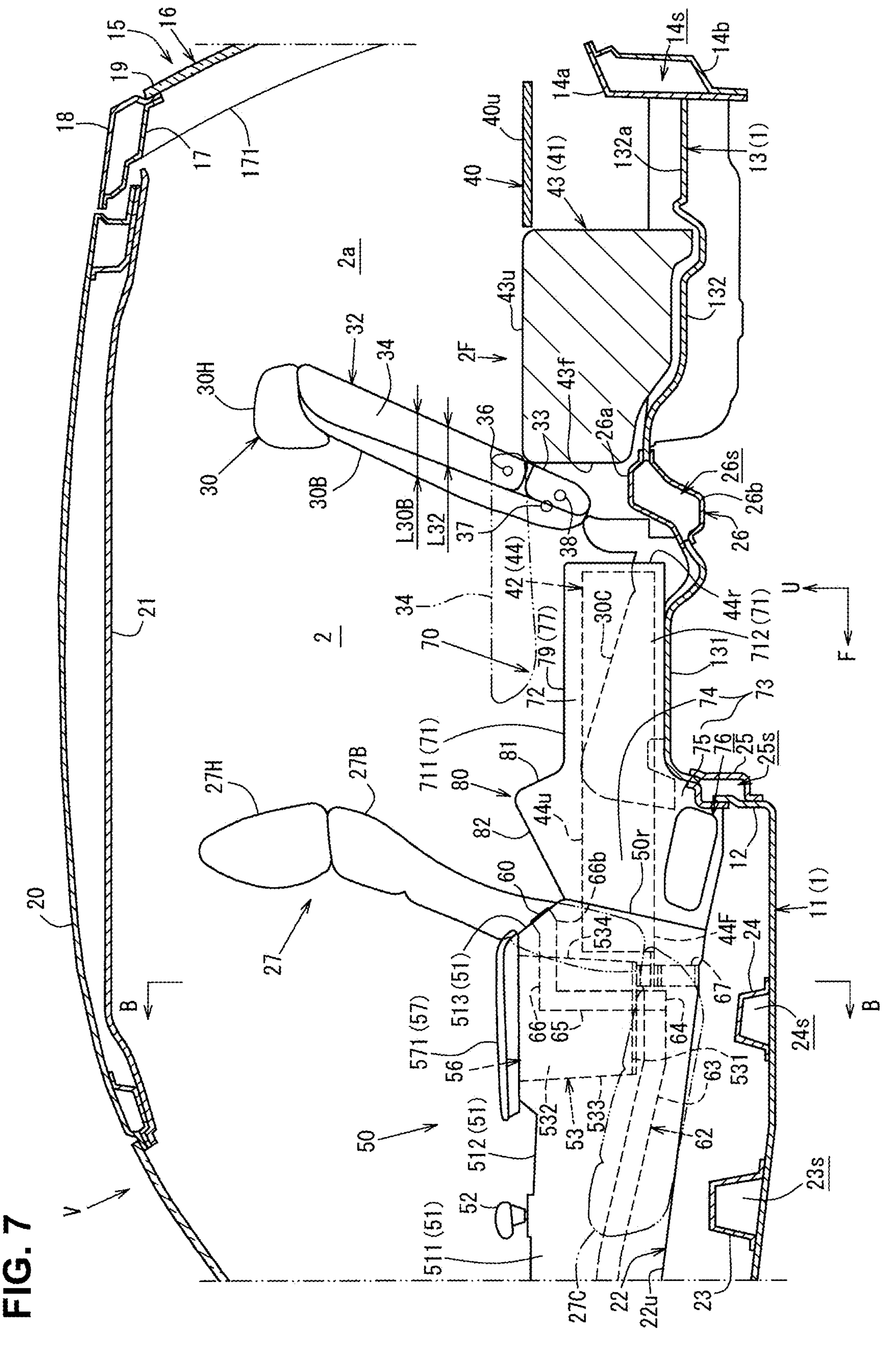
FIG. 7 is an enlarged view of the main part shown in FIG. 6.

Thus, as shown in FIG. 1, the rear-seat armrest 34 taking the upright-standing position forms a front face of an upper part of the middle seatback portion 32. Meanwhile, as shown in FIGS. 4 and 7, the rear-seat armrest 34 constitutes a horizontal armrest when the armrest 34 is forward folded.

Herein, as shown in FIG. 4, the seatbacks 30B, 31B of the right-and-left rear seats 30, 31 are configured to be forward folded by rotating around each support point 37 (seatback rotational support point) (see FIG. 6) which is provided at each lower part thereof.

Likewise, the middle seatback portion 32 is configured to be forward folded by rotating around another support point 38 (seatback rotational support point) (see FIG. 6) which is positioned below the above-described support point 36 (armrest rotational support point) as shown in FIG. 4.

Herein, the lower part of the middle seatback portion 32 is pivotally supported via the above-described support point 38 relative to an bracket (not illustrated) which rises upward from the rear-seat cushion panel 131. However, the middle seatback portion 32 may be pivotally supported directly via the support point 38 or indirectly by using a bracket or the like relative to the rear seats 30, 31 or a case of a second battery for drive.

Figure 8:
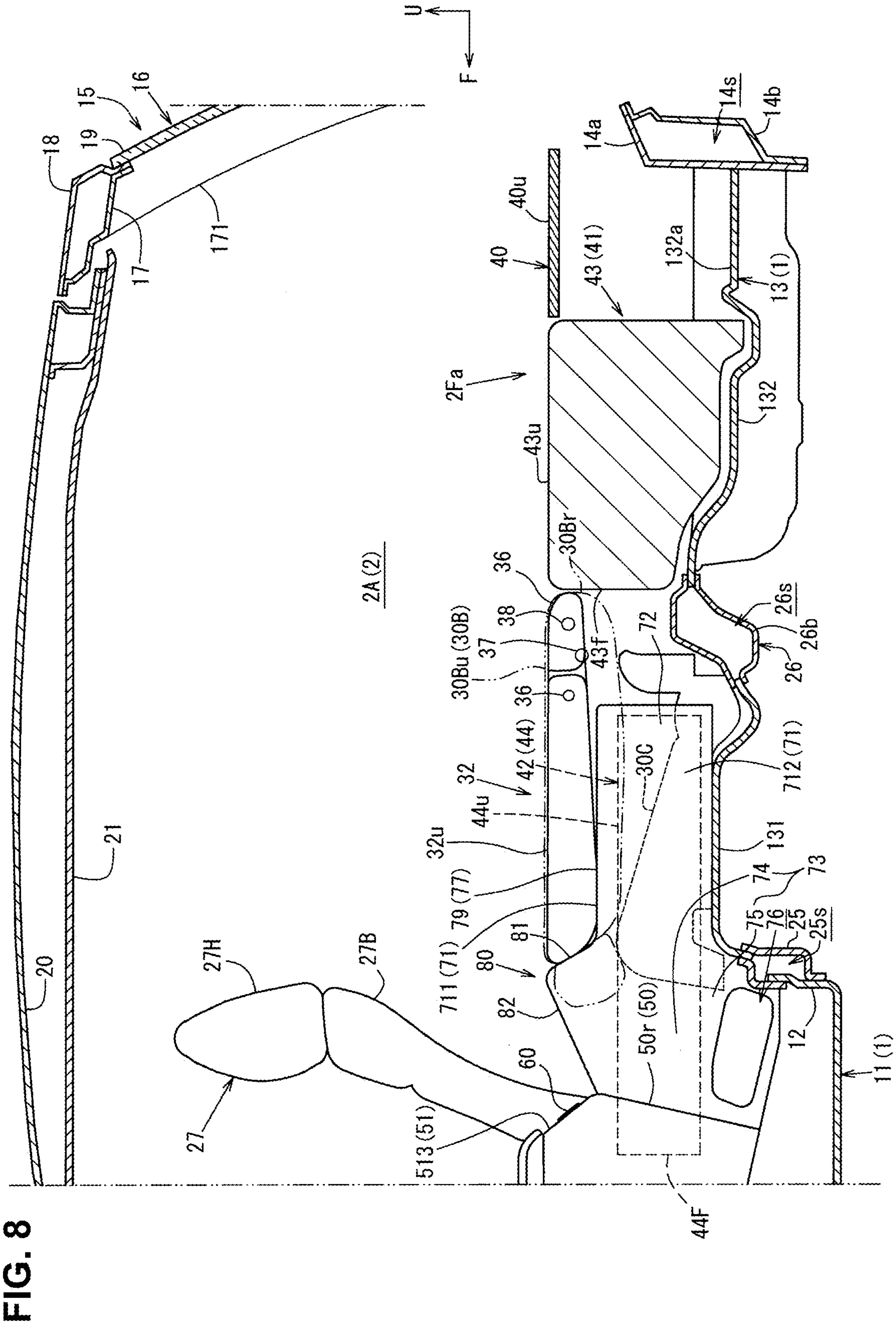
FIG. 8 is an enlarged view of the main part shown in FIG. 7 in a state where the seatbacks of the rear seats and the middle seatback portion are all forward folded.

Herein, as shown in FIG. 7, the longitudinal thickness (L32) of the middle seatback portion 32 in the upright position is configured to be smaller than that (L30*b*) of each of the seatbacks 30B, 31B of the right-and-left rear seats 30, 31 in the upright position. The longitudinal thickness of the seatback 31B of the left-side rear seat 31 is set to be equal to that of the seatback 30B of the right-side rear seat 31. Thereby, as shown in FIGS. 4 and 8, according to the vehicle V of the present embodiment, when the seatbacks 30B, 31B are forward folded onto the seat cushions 30C, 31C, respectively, and also the middle seatback portion 32 is folded onto the rear-seat center console portion 70, respective back face portions 30Bu, 31Bu of the forward-folded seatbacks 30B, 31B and a back face portion 32*u* of the forward-folded middle seatback portion 32 form a substantially flat surface.

(Basic Structure of First and Second Batteries for Drive 41, 42)

Figure 2:
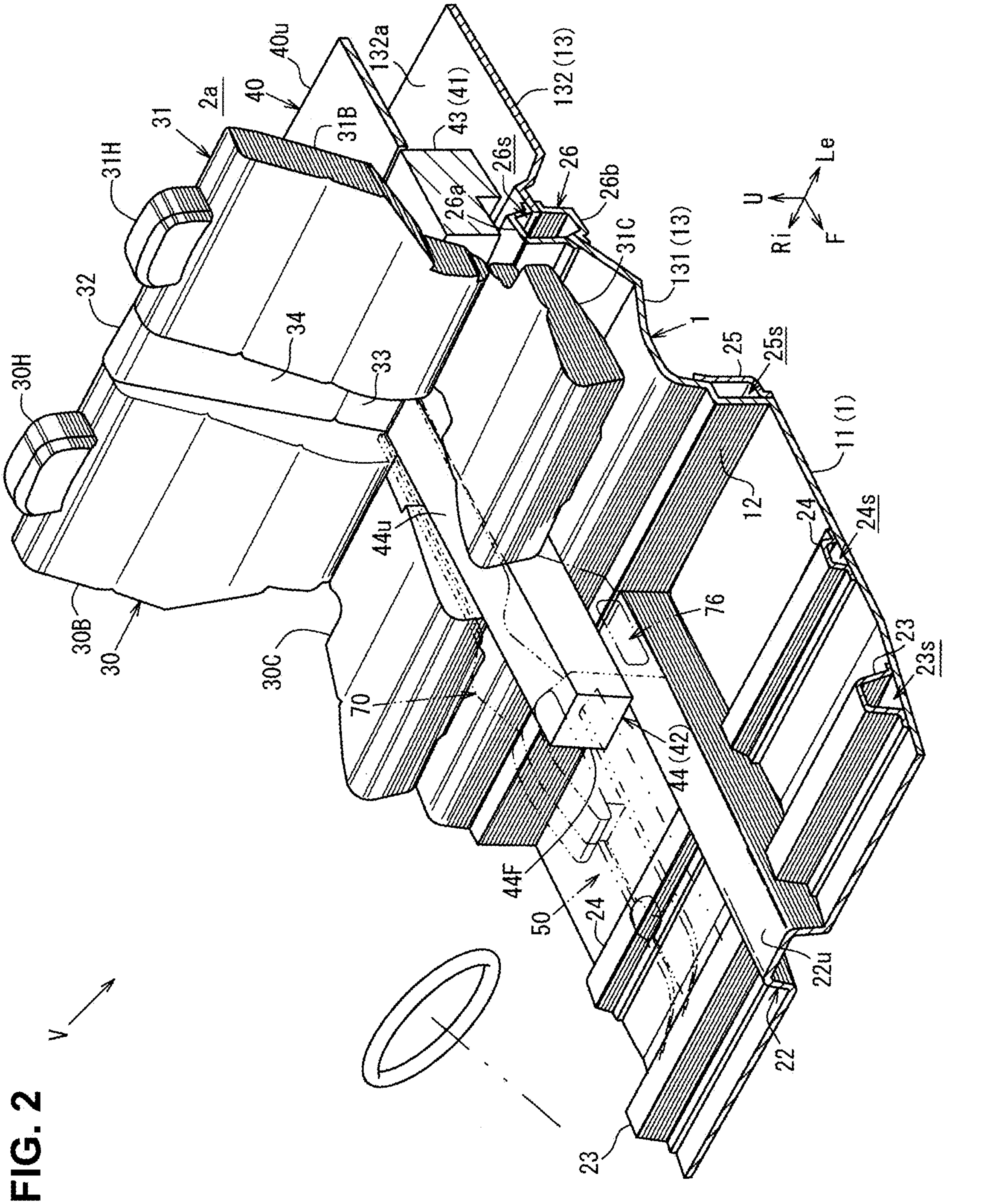
FIG. 2 is a perspective sectional view of the main part of the vehicle shown in FIG. 1 in which illustration of a front seat is omitted, and a front-seat center console portion and a rear-seat center console portion are shown by an imaginary line.
Figure 3:
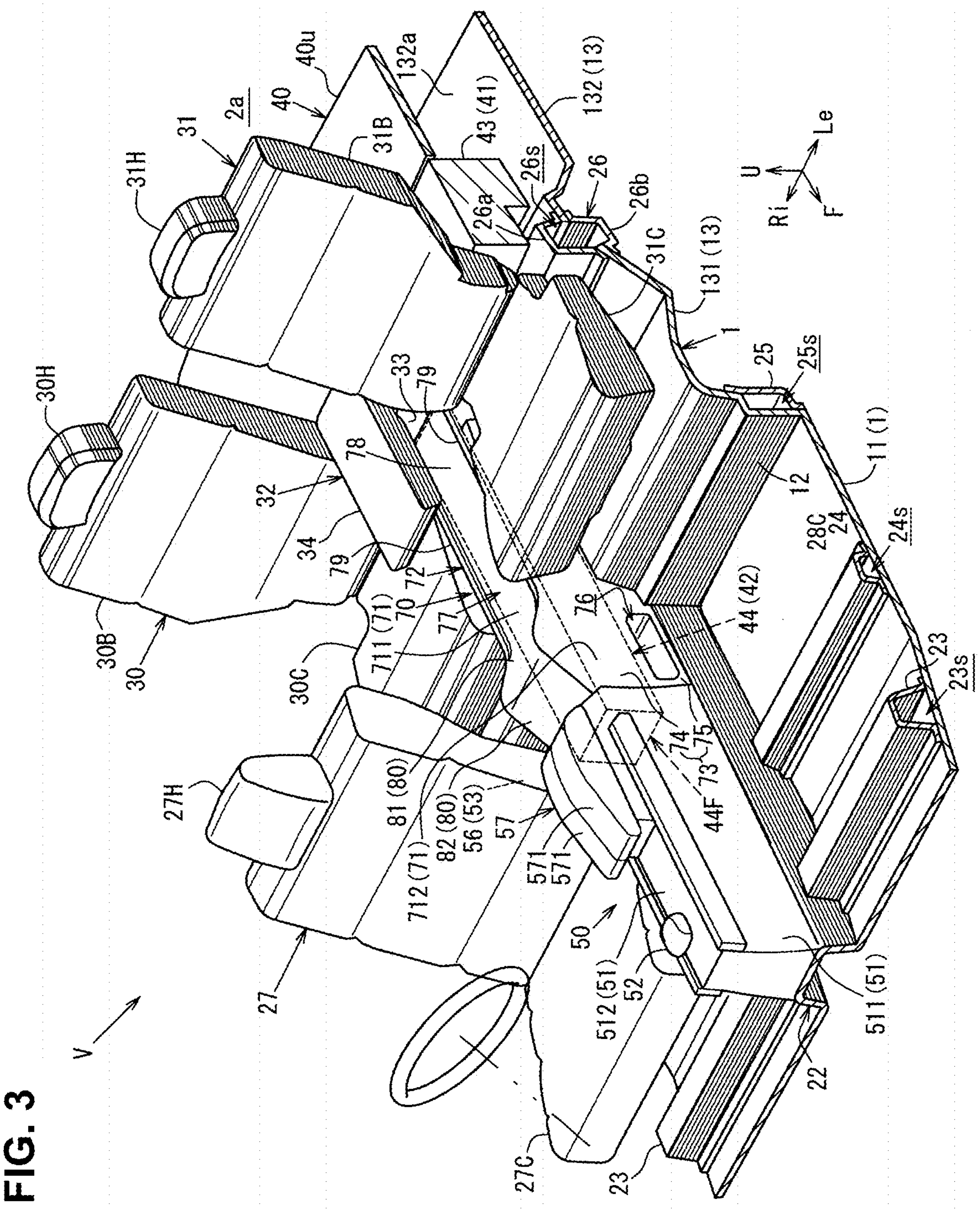
FIG. 3 is a perspective sectional view of the main part of the vehicle shown in FIG. 1 in a state where a rear-seat armrest is forward folded.

As shown in FIGS. 1, 2 and 7, since the vehicle V of the present embodiment is the plug-in hybrid electric vehicle (PHEV), the batteries for drive 41, 42 are installed. The first battery for drive 41 and the second battery for drive 42 are installed such that they are arranged above the floor panel 1, respectively.

Each of the first and second batteries 41, 42 comprises a single or plural battery packs (not illustrated) as a first battery body and a second battery body. The battery packs of the present embodiment are stored in battery cases 43, 44, respectively, and they are configured such that plural battery cells are arranged in line and connected to each other inside the battery cases 43, 44.

The battery constituting the battery pack may be a lead storage battery, lithium-ion battery, or nickel-hydrogen battery, or a different type of secondary battery. Further, a fuel cell battery is applicable as well. Each of the battery cases 43, 44 of the first and second batteries 41, 42 is made of an aluminum dicast, for example, so as to ensure the specified rigidity, and each of their upper face portions 43*u*, 44*u* is formed in a flat-face shape as shown in FIG. 5.

(First Battery 41)

As shown in FIGS. 1, 5 and 7, the first battery 41 is arranged in a lower space of the baggage compartment 2*a* behind the right-and-left rear seats 30, 31. The battery case 43 of the first battery 41 (hereafter, referred to as the "first battery case 43") extends straight in the vehicle width direction, and is arranged over an almost whole length, in the vehicle width direction, of a front part of the baggage-compartment floor panel 132 which forms the floor surface of the baggage compartment 2*a*. The first battery case 43 is stored at a front part of the baggage-compartment floor panel 132 which is located in front of the recess portion 132*a* storing the spare tire.

As shown in FIG. 5, the first battery case 43 is attached to the above-described middle rear cross member 26 and a pair of rear side frames 3 which are provided at both sides of the baggage-compartment floor panel 132 as a vehicle-body rigidity member via brackets 45 or the like by a fastening member of bolts and nuts.

The first battery case 43 is, as shown in FIGS. 4 and 8, arranged behind the rear seats 30, 31 such that its front end portion 43*f* is close to respective rear end portions 30Br, 31Br of the forward-folded seatbacks 30B, 31B of the rear seats 30, 31 with substantially no gap formed, in the longitudinal direction, between the front end portion 43*f* and the rear end portions 30Br, 31Br.

Further, as shown in FIG. 4, the first battery case 43 is arranged such that its upper face portion 43*u* and the respective back face portions 30Bu, 31Bu, 32*u* of the seatbacks 30B, 31B of the right-and-rear rear seats 30, 31 and the middle seatback portion 32, which are all forward folded, form a substantially flat surface.

Meanwhile, as shown in FIGS. 4 and 6, above the baggage-compartment floor panel 132 and behind a rear end portion of the first battery case 43 is provided a baggage-compartment partition board 40 to vertically partition a rear part of the baggage compartment 2*a*, which is configured to extend horizontally and detachable. An arrangement height of this board 40 is set such that its upper face portion 40*u* is located substantially at the same level as the upper face portion 43*u* of the first battery case 43.

Accordingly, in a state where the baggage-competent partition board 40 is set at its arrangement position, the respective upper face portions 43*u*, 40*u* of the first battery case 43 and the baggage-compartment partition board 40 form a substantial baggage-compartment floor surface 2F which is different from the baggage-compartment floor surface formed by the upper face portion of the baggage-compartment panel 132 (see FIGS. 6 and 7).

Moreover, as shown in FIGS. 4 and 8, when the seatbacks 30B, 31B of the rear seats 30, 31 and the middle seatback portion 32 are forward folded, the respective back face portions 30Bu, 31Bu, 32*u* of these members 30B, 31B, 32 and the respective upper face portions 43*u*, 40*u* of the first battery case 43 and the baggage-compartment partition board 40 form a substantially flat and large surface.

That is, the baggage-compartment floor surface 2F formed by the respective upper face portions 43*u*, 40*u* is enlarged to an area around the rear seats 30, 31 by the respective 30Bu, 31Bu, 32*u*, thereby producing a flat and enlarged baggage-compartment floor surface 2Fa which is capable of loading a large volume of baggage.

Herein, either one of the seatbacks 30B, 31B, 32 may be configured not to be forward folded because these seatbacks 30*b*, 31*b*, 32 can be forward folded independently, which is not illustrated. Thereby, allowing the passenger to be seated in the non-folded seatback 30B or 31B and enlarging a space of the baggage compartment 2*a* can be compatible. Further, the baggage-compartment partition board 40 is not necessary, so the vehicle may not be provided with this board. Meanwhile, the board 40 may be configured such that it extends forward so as to be placed from above onto the upper face portion 43*u* of the first battery case 43 and its forward extension portion forms a substantial upper face portion (43*u*) of the first battery case 43.

(Second Battery 42)

As shown in FIGS. 2, 5 and 7, the second battery for drive 42 is arranged between the seat cushions 30C, 31C of the right-and-left rear seats 30, 31 in the vehicle width direction. Specifically, while it is arranged above the rear-seat cushion panel 131, the second battery 42 is not positioned below the seat cushions 30C, 31C of the rear seats 30, 31, for example, and it is just longitudinally arranged in a straight shape between the seat cushions 30C, 31C of the rear seats 30, 31 in the vehicle width direction of the rear-seat cushion panel 131.

The battery case 44 of the second battery 42 (hereafter, referred to as the “second battery case 44”) is fixedly attached to the upper face portion of the rear-seat cushion panel 131 by a fastening member of bolts and nuts, not illustrated. As shown in FIG. 7, the second battery case 44 extends forward and straight such that its rear end portion 44*r* is arranged close to the front end portion 43*f* of a central portion, in the vehicle width direction, of the first battery case 43.

Thereby, the first and second battery cases 43, 44 are configured substantially in a T-letter shape in a plan view as a whole. Further, as shown in FIGS. 2, 5 and 7, the second battery case 44 is arranged such that its front portion horizontally extends forward from the kick-up portion 12 along the tunnel portion 22 and is separated upward from the upper face portion 22*u* of the tunnel portion 22 (see FIG. 2). Herein, in the present embodiment, the battery pack inside the second battery case 44 are composed of many batteries which are arranged in line along the longitudinal direction, corresponding to the second battery case 44 extending in the longitudinal direction, which is not illustrated. Thus, the sufficient battery volume of the second battery 42 is ensured by forward extending the second battery case 44 beyond the kick-up portion 12.

As shown in FIGS. 1, 2, 5, 7 and 8, especially in FIG. 8, the front end portion 44F of the second battery case 44 extends forward beyond a rear end portion 50*r* of the front-seat center console portion 50 so that it can be engaged into the front-seat center console portion 50 from behind. This front end portion 44F is supported by the tunnel portion 22 via an attaching member 67 described later (FIG. 7) inside the front-seat center console portion 50. Thereby, a front portion of the second battery case 44 (i.e., the extension portion beyond the kick-up portion 12) is provided to extend horizontally between the attaching member 67 and the rear-seat cushion panel 131.

(Front-Seat Center Console Portion 50)

As shown in FIGS. 1 and 5, the front-seat center console portion 50 is connected to a front end of a lower part of a central portion, in the vehicle width direction, of an instrument panel 7 (see FIG. 6) which extends in the vehicle width direction at a front side of the cabin 2 at around its front end.

As shown in FIGS. 1, 5, 6 and 7, the front-seat center console portion 50 comprises a cover member 51 as a hollow-box shaped interior member, a shift lever 52, an object storage portion 53, a lid 57, the attaching member 67 (see FIG. 7) to support the object storage portion 53, and a rear-seat supply duct 62 (see FIGS. 6 and 7).

As shown in FIGS. 1 and 5, the cover member 51 comprises a pair of right-and-left side face portions 511 (see FIG. 10) which form a side face of the center console portion 50, a top face portion 512 which forms a front portion of an upper face portion of the center console portion 50, and a rear face portion 513 (see FIG. 5) which is arranged at an upper portion of the rear end portion 50*r* of the center console portion 50, which are all decorative panels.

The shift lever 52 is a lever for shifting a transmission (not illustrated) of the vehicle V according to a passenger’s operation. This shift lever 52 is arranged at a position which is located at a front side and a central side, in the vehicle width direction, of the top face portion 512.

As shown in FIG. 7, the object storage portion 53 is provided at a rear part of the front-seat center console portion 50. This object storage portion 53 comprises a bottom wall 531, a pair of right-and-left side walls 532 which rise from both-side edges of the bottom wall 531 (see FIG. 10), a front wall 533 which rises from a front edge of the bottom wall 531, and a rear wall 534 which rises from a rear edge of the bottom wall 531, and also has an opening portion 56 which opens upward, so that the object storage portion 53 is of a cuboid shape with floor. The above-described opening portion 56 is provided behind the top face portion 512 of the front-seat center console portion 50.

Herein, the object storage portion 53 of the present embodiment is deep enough to store a tablet terminal positioned in a vertical state.

Figure 10:
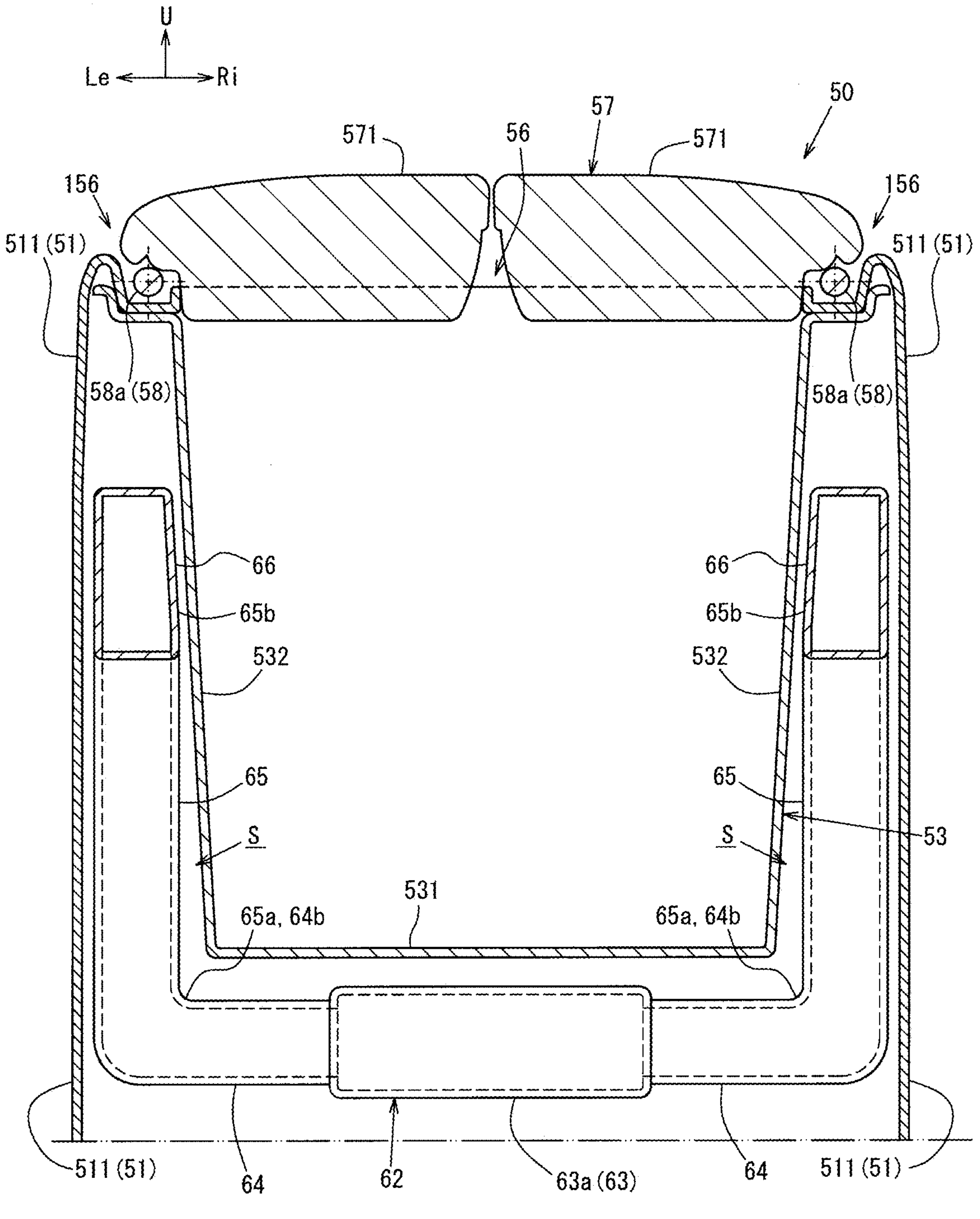
FIG. 10 is a sectional view taken along line B-B of FIG. 6.

The lid 57 is provided above the object storage portion 53 so as to open and close the opening portion 56. The lid 57 comprises a pair of right-and-left split lids 571, 571 which can open and close the opening portion 56 of the object storage portion 53. As shown in FIG. 10, a pair of pivot portions 58, 58 are provided at right-and-left side portions 156, 156 of an upper face of the rear part of the front-seat center console portion 50. These pivot portions 58, 58 pivotally support the right-and-left split lids 571, 571 relative to the side portions 156 via pivotal axes 58*a* extending in the longitudinal direction. Thus, the right-and-left split lids 571, 571 form a double-hinged door type in which the opening portion 56 is opened at the center.

The lid 57 positioned in closed state of the opening portion 56 has the sufficient strength and cushion performance so that it can serve as an armrest for the passenger. Further, an upper face portion of the lid 57 of the object storage portion 53 is located at a higher level than the top face portion 512, and has largeness and height which can make a front arm of the front-seat passenger (seated in the front seats 27, 28) be properly placed on that.

Herein, the front-seat center console portion 50 of the present embodiment has not only the shift lever 52 but some other operational portions to conduct various setting of the vehicle V, such as a navigation system, and some support brackets to support shift operational mechanisms of the shift lever 52 and others, which are not illustrated here.

As shown in FIG. 5, the front-seat center console portion 50 is a console with a rear vent for air-conditioning of the rear-seat passenger, and an air-conditioning discharge port 60 for the rear-seat passenger (seated in the rear seats 30, 31) is formed at the rear face portion 513 of the above-described cover member 51.

As shown in FIG. 7, the rear face portion 513 is arranged behind the object storage portion 53 and substantially at the same level as the top face portion 512, and the air-conditioning discharge port 60 formed at the central portion, in an elevational view, of the rear face portion 513 is configured to be inclined obliquely downward-and-rearward so as to face a head-chest portion of the rear-seat passenger. Herein, this discharge port 60 is provided with a louver which closes or opens the discharge port 60 and changes an air-supply direction.

Herein, as shown in FIG. 6, inside the instrument panel 7 disposed at the front side of the cabin 2 are provided an air-conditioning unit 100 (air-conditioner) and a front-seat supply duct 101 to supply conditioning air (cool/warm air) from the air-conditioning unit 100 to a front-seat discharge port (not illustrated) which is provided at a dashboard.

The rear-seat supply duct 62 is connected to an upstream side of the front-seat supply duct 101, and a part of the conditioning air flowing from the air-conditioning unit 100 to the front-seat discharge port (not illustrated) through the front-seat supply duct 101 is divided into the rear-seat supply duct 62.

The rear-seat supply duct 62 is provided to penetrate (extend) the inside of the front-seat center console portion 50 in the longitudinal direction, and its rear end portion (66*b*) is connected to the rear-seat discharge port 60 provided at the rear face portion 513 of the front-seat center console portion 50. A rear blower 102 is arranged at a portion near a connection portion of the rear-seat supply duct 62 to the front-seat supply duct 101, i.e., at its upstream-side portion.

When the air-conditioning unit 100 is operated, part of the conditioning air is discharged from the front-seat discharge port (not illustrated), and the rest of the conditioning air is supplied toward the rear-seat supply duct 62, which is then supplied with pressure toward the rear-seat discharge port 60 through the rear-seat supply duct 62 by the rear blower 102.

Figure 9:
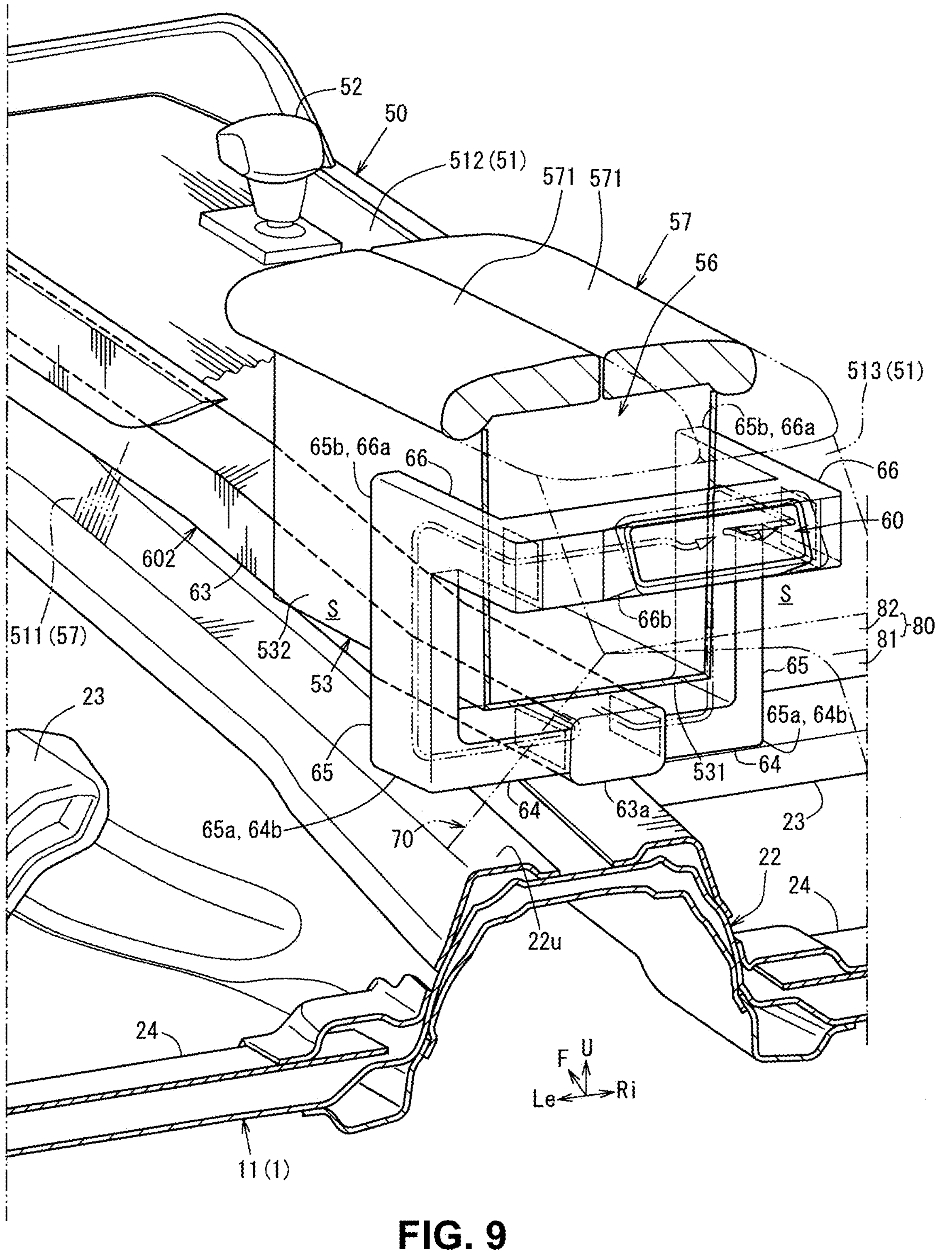
FIG. 9 is a perspective view explaining an arrangement structure of a supply duct for the rear seat.

Next, an arrangement route of the rear-seat supply duct 62 will be described specifically. As shown in FIGS. 6, 7 and 9, the rear-seat supply duct 62 includes a rearward arrangement portion 63, a pair of right-and-left outward arrangement portions 64, a pair of right-and-left upward arrangement portions 65, and a pair of right-and-left upper-rearward arrangement portions 66, which are located along a conditioning-air flowing direction from its upstream side toward its downstream side.

The rearward arrangement portion 63 is arranged rearward from its connection portion to the front-seat supply duct 101 along the upper face portion 22*u* of the tunnel portion 22. As shown in FIGS. 7 and 9, a rear part of the rearward arrangement portion 63 is arranged rearward from a front side of the front wall 533 of the object storage portion 53 such that it goes into a space which is positioned just below the bottom wall 531 of the object storage portion 53, i.e., between the bottom wall 531 and the upper face portion 22*u* of the tunnel portion 22.

As shown in FIGS. 7 and 9, this rear part of the rearward arrangement portion 63 is arranged substantially horizontally up to a position which is located at the central portion, in the vehicle width direction, of the object storage portion 53 and also located just before the rear wall 534 of the object storage portion 53 in the longitudinal direction (see FIG. 7). That is, a rear end portion 63*a* of the rearward arrangement portion 63 is located just below the bottom wall 531 of the object storage portion 53.

As shown in FIGS. 9 and 10, the pair of right-and-left outward arrangement portions 64 extend substantially horizontally from the rear end portion 63*a* of the rearward arrangement portion 63 toward right-and-left both sides in the vehicle width direction, so that each inside of the right-and-left outward arrangement portions 64 is continuous to an inside of the rearward arrangement portion 63 via the rear end portion 63*a*. Thus, the rear-seat supply duct 62 is divided into the right-and-left sides at the position just below the bottom wall 531 of the object storage portion 53.

That is, the pair of right-and-left outward arrangement portions 64 are arranged toward the outward sides in the vehicle width direction, i.e., the opposite sides to each other, from the rear end portion 63*a* of the rearward arrangement portion 63. Each outward end portion 64*b* of the right-and-left outward arrangement portions 64 is positioned in a space S between the side face portion 511 of the front-seat center console portion 50 and the side wall 532 of the object storage portion 53.

Each of the upward arrangement portions 65 is arranged vertically upward along the side wall 532 of the object storage portion 53 in the space S between the side face portion 511 of the front-seat center console portion 50 and the side wall 532 of the object storage portion 53. Further, the upward arrangement portion 65 is connected to the outward end portion 64*b*, in the vehicle width direction, of the outward arrangement portions 64 at its lower end portion 65*a*, and, as shown in FIGS. 7 and 9, it is arranged to extend up to an upper level corresponding to the rear-seat discharge port 60.

Herein, as shown in FIG. 10, the space S between the side face portion 511 of the front-seat center console portion 50 and the side wall 532 of the object storage portion 53 exists as a dead space at a position which is just below the side portion 156 of the opening portion 56 of the object storage portion 53 at the rear part of the front-seat center console portion 50. In the present embodiment, as described above, the pivot portion 58 to pivotally support the openable split lid 571 is provided at the side portion 156 of the opening portion 56 of the front-seat center console portion 50. Accordingly, the width of the above-described space S is configured to be relatively large compared to a structure which has no pivot portion at the side portion 156 of the opening portion 56 like the pivot portion 58 of the present embodiment.

In the present embodiment, the upward arrangement portion 65 is arranged over a whole length, in the vertical direction, of the above-described space S, so that this space S, i.e., the wide dead space, can be utilized (see FIG. 10).

Herein, the upward arrangement portion 65 is not limited to the above-described vertical arrangement (see FIGS. 7 and 9), and it may be arranged in an inclined shape in a side view of the vehicle V such that its upper side is located at a rear position, which is not illustrated. In any case, the upward arrangement portion 65 is positioned on a forward side of the rear wall 534 of the object storage portion 53.

Thus, as shown in FIG. 7, the upward arrangement portion 65 is arranged in front of the front end portion 44F of the second battery case 44 which is positioned on the rearward side of the rear wall 534 of the object storage portion 53. Accordingly, since the upward arrangement portion 65 is not disposed on the side of the front end portion 44F, the width, in the vehicle width direction, of the second battery case 44 is not restrained improperly by this upward arrangement portion 65, thereby ensuring the sufficient battery volume.

Further, each of the pair of right-and-left upper-rearward arrangement portions 66 is arranged in the longitudinal direction at the level corresponding to the rear-seat discharge port 60, in other words, above the upper face portion 44*u* of the front end portion 44F of the second battery case 44. A front end portion 66*a* of the upper-rearward arrangement portion 66 is connected to an upper end portion 65*b* of the above-described upward arrangement portion 65.

The upper-rearward arrangement portion 66 is substantially horizontally arranged rearward from the upper end portion 65*b* of the upward arrangement portion 65 to the rear-seat discharge port 60 which is positioned on the rearward side of the rear wall 534 of the object storage portion 53, and its rear end portion 66*b* is connected to the rear-seat discharge port 60. Herein, the upper-rearward arrangement portions 66 may be configured such that their rear parts are respectively arranged on an inward side, in the vehicle width direction, of the vehicle body at a position which is located on the rearward side of the rear wall 534 of the object storage portion 53 and also on the forward side of the rear-seat discharge portion 60, and their rear end portions 66*b* (inward end portions in the vehicle width direction) are connected to the rear-seat discharge port 60 independently or in a joint manner.

Herein, as shown in FIG. 7, the second battery case 44 is configured as described above such that its front end portion 44F extends forward beyond the rear end portion 50*r* of the front-seat center console portion 50 and goes into the inside of the front-seat center console portion 50, and the panel-shaped rear face portion 513 where the rear-seat discharge portion 60 is formed is arranged at a higher level than the upper face portion 44*u* of the front end portion 44F of the second battery case 44. The rear end portion (66*b*) of the rear-seat supply duct 62 which is connected to the rear-seat discharge port 60, i.e., the rear end portion 66*b* of the upper-rearward arrangement portion 66, is supported from just below by the front end portion 44F of the second battery case 44 (not illustrated).

Specifically, the rear end portion 66*b* of the upper-rearward arrangement portion 66 is fixedly attached to the upper face portion 44*u* of the front end portion 44F of the second battery case 44 via a bracket or the like (not illustrated).

(Attaching Member 67 of Object Storage Portion 53 to Second Battery Case 44)

Figure 11:
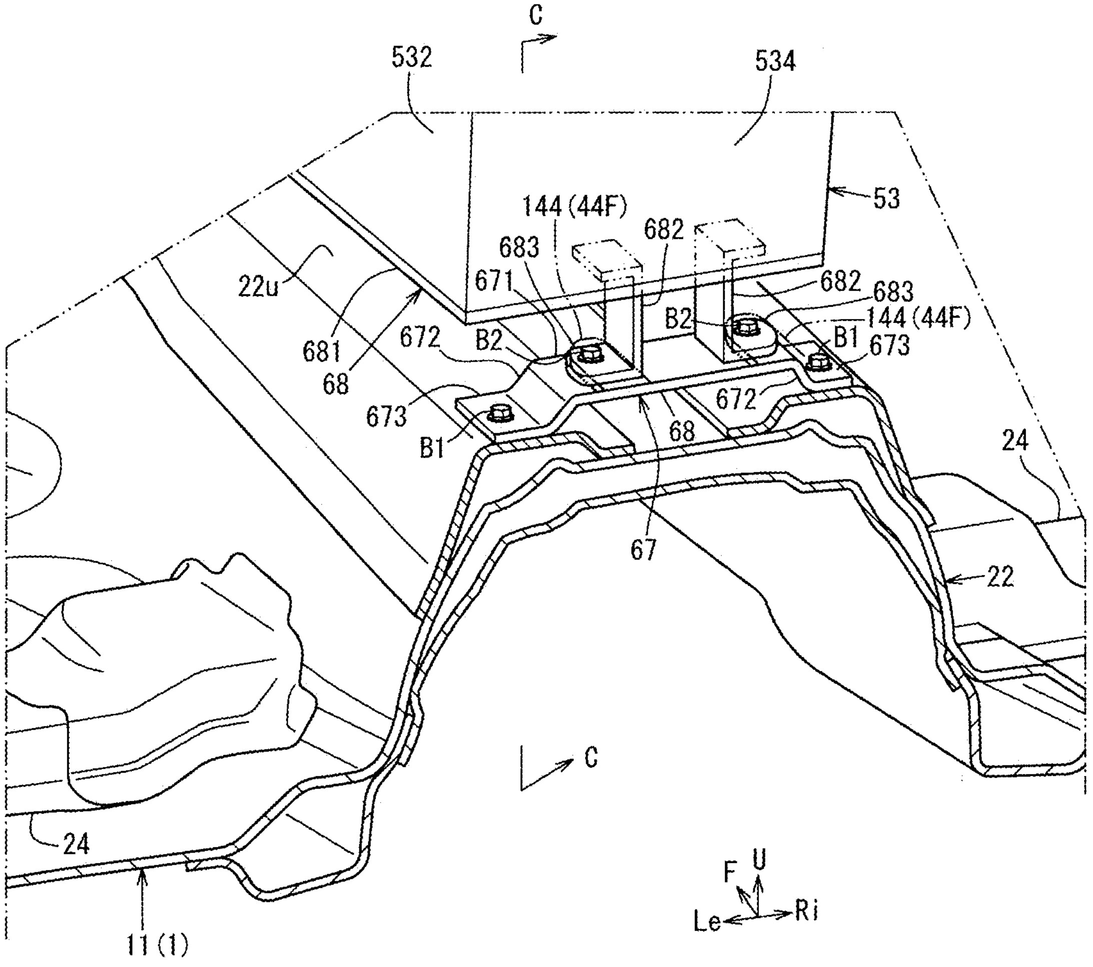
FIG. 11 is a perspective sectional view of an attaching member to attach and support an object storage portion and its surroundings, when viewed from a rear side of the vehicle.
Figure 13:
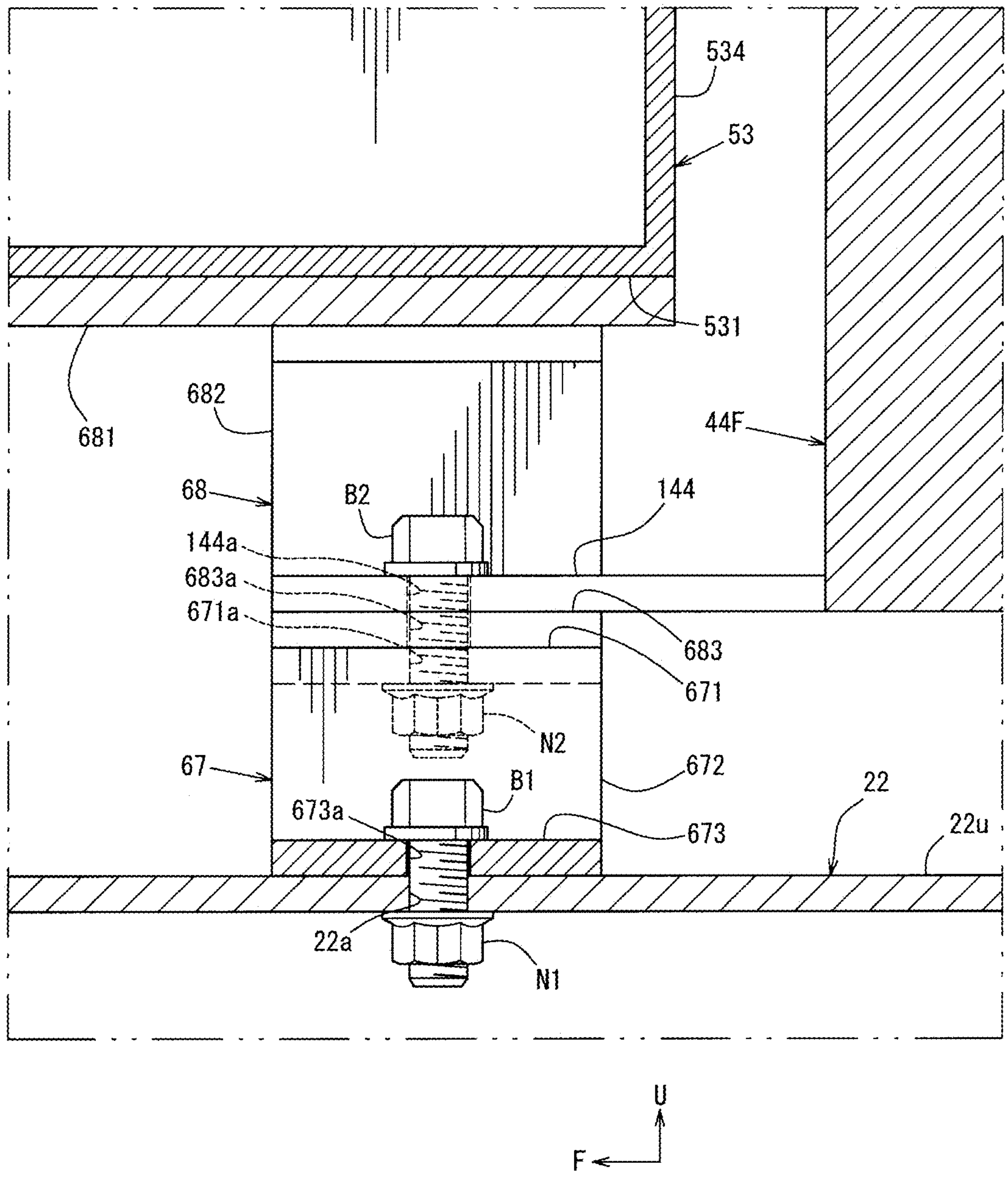
FIG. 13 is a sectional view taken along line C-C of FIG. 11.

As shown in FIGS. 7, 11 and 13, the attaching member 67 to support the object storage portion 53 is provided between the bottom wall 531 (see FIG. 13) of the object storage portion 53 and the upper face portion 22*u* of the tunnel portion 22 inside the front-seat center console portion 50. That is, the object storage portion 53 is supported at the upper face portion 22*u* of the tunnel portion 22 via the attaching member 67.

Meanwhile, as shown in FIGS. 7, 11-13, the front end portion 44F of the second battery case 44 extends forward to a position in the vicinity of a rearward side of the rear wall 534 of the object storage portion 53. Further, the attaching member 67 to support the object storage portion 53 also serves as another attaching member to support the front end portion 44F of the second battery case 44. That is, the object storage portion 53 of the front-seat center console portion 50 and the front end portion 44F of the second battery case 44 are attached to the upper face portion 22*u* of the tunnel portion 22 via the common attaching member 67.

Figure 12:
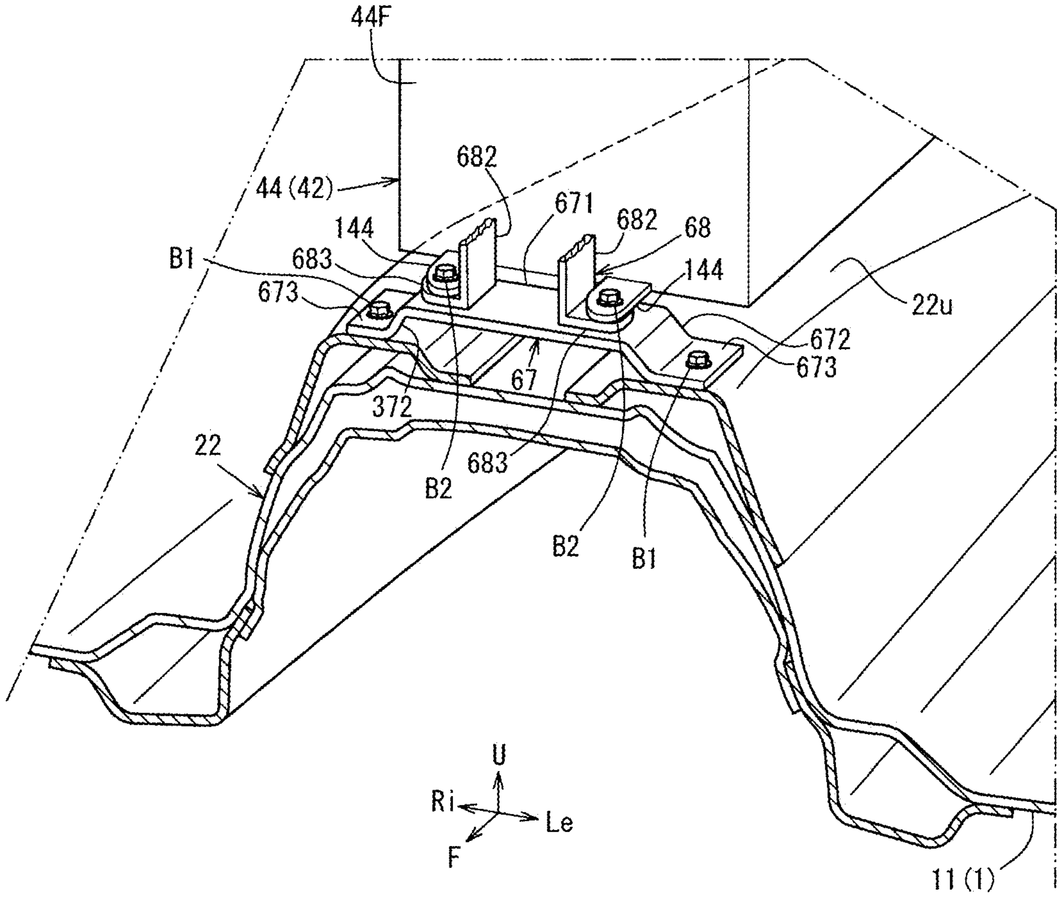
FIG. 12 is a perspective sectional view of an attaching member to attach and support a second battery case and its surroundings, when viewed from a front side of the vehicle.

Specifically, as shown in FIGS. 11-13, the attaching member 67 is a steel-plate member which is integrally formed by a support portion 671 which extends in the vehicle width direction along the upper face portion 22*u* of the tunnel portion 22 so as to receive the rear part of the bottom wall 531 of the object storage portion 53 and the front end portion 44F of the second battery case 44 thereon, right-and-left leg portions 672 which extend downward from right-and-left both end portions of the support portion 671, and right-and-left flange portions 673 which extend outward from respective outward ends, in the vehicle width direction, of the leg portions 672 and are placed on the both sides of the upper face portion 22*u* of the tunnel portion 22. This attaching member 67 is configured to have a roughly hat-shaped cross section. As shown in FIG. 13, for example, bolt insertion holes 671*a* are formed at both sides of the support portion 671 such that they vertically penetrate these both sides, and also bolt insertion holes 673*a* are formed at the right-and-left flange portions 673 such that they vertically penetrate these flange portions.

As shown in FIGS. 11-13, at the front end portion 44F of the second battery case 44 are provided a pair of flange portions 144 which extend forward from right-and-left both sides of its lower end portion. A vertically-penetrating bolt insertion hole 144*a* is formed at each tip end portion (front end portion) of the pair of flange portions 144 as shown in FIG. 13.

As shown in FIG. 11-13, a box support bracket 68 is provided below the object storage portion 53 and above the attaching member 67. The box support bracket 68 comprises a bottom-wall reinforcement portion 681 which supports at least a rear part, in the longitudinal direction, of the bottom wall 531 of the object storage portion 53 and is joined to a lower face of the bottom wall 531 for reinforcement (see FIGS. 11 and 13), a pair of right-and-left support leg portions 682 which extend downward from right-and-left both sides of the bottom-wall reinforcement portion 681, and right-and-left flange portions 683 which extend toward the outward side, in the vehicle width direction, from respective lower end portions of the support leg portions 682. As shown in FIG. 13, each tip end portion of the flange portions 683 of the box support bracket 68 has a bolt insertion hole 683*a* which vertically penetrates that.

The above-described flange portions 673 of the attaching member 67 are placed on the upper face portion 22*u* of the tunnel portion 22 in a state where their bolt insertion holes 673*a*, 22*a* (see FIG. 13) match each other in the vertical direction at the right-and-left sides. The flange portion 673 and the upper face portion 22*u* are fixedly fastened by using a bolt B1 and a nut N1 which are inserted into the bolt insertion holes 673*a*, 22*a*.

Further, the flange portion 144 provided at the front end portion 44F of the second battery case 44 and the flange portion 683 provided at the box support bracket 68 are placed in order on the support portion 671 of the attaching member 67 in a state where the respective bolt insertion holes 144*a*, 683*a*, 671*a* match each other in the vertical direction. Then, these flange portions 144, 683 are fastened together by using a bolt B2 and a nut N2 which are inserted into the bolt insertion holes 144*a*, 683*a*, 671*a*.

Herein, the attaching member 67 is provided just below the object storage portion 53 in the above-described embodiment, but it may be provided just below the front end portion 44F of the second battery case instead. In any case, the front end portion 44F of the second battery case 44 can be made to extend more close to the rear wall 534 of the object storage portion 53 compared to a case where the attaching member 67 is placed between the rear wall 534 of the object storage portion 53 and a front face of the front end portion 44F of the second battery case 44. Accordingly, the sufficient battery volume of the second battery 42 can be ensured.

(Rear-Seat Center Console Portion 70)

As shown in FIGS. 1, 5 and 6, the above-described rear-seat center console portion 70 comprises a top face portion 711 which is provided to rise from the rear-seat cushion panel 131 and forms its upper face as a resin-made interior member 71 and a pair of right-and-left side face portions 712 (the left-side one is only illustrated) which extend downward from right-and-left both ends of its upper end, which are all decorative panels.

The above-described second battery case 44 is stored inside the rear-seat center console portion 70 which is partitioned by the top face portion 711 and the right-and-left side face portions 712. That is, the second battery case 44 is provided inside the rear-seat center console portion 70 over its roughly whole length so as to serve as a frame member of the rear-seat center console portion 70, thereby reinforcing the rear-seat center console portion 70.

Accordingly, the top face portion 711 and the right-and-left side face portions 712 may be supported by the rear-seat cushion panel 131 via brackets (not illustrated) disposed inside the rear-seat center console portion 70, but these portions 711, 712 may be fixedly attached to the second battery case 44 instead (not illustrated). Specifically, the top face portion 711 may be supported by the second battery case 44.

As shown in FIGS. 1, 5 and 6, the rear-seat center console portion 70 is provided at a central part, in the vehicle width direction, of the cabin 2 continuously, in the longitudinal direction, to the above-described front-seat center console portion 50. Specifically, as shown in FIGS. 5 and 6, the two center console portions 70, 50 are connected such that a front end portion of the top face portion 711 of the rear-seat center console portion 70 and a lower end portion of the rear face portion 513 which is provided at the rear-seat discharge port 60 of the front-seat center console portion 50 are connected through engagement or the like, likewise, a front end portion of the right-side side face portion (not illustrated) of the rear-seat center console portion 70 and a rear end portion of the right-side side face portion 511 (see FIG. 10) of the front-seat center console portion 50 are connected, and a front end portion of the left-side side face portion 712 of the rear-seat center console portion 70 and a rear end portion of the left-side side face portion 511 of the front-seat center console portion 50 are connected. Herein, the right-and-left side face portions 511 of the front-seat center console portion 50 and the right-and-left side face portions 712 of the rear-seat center console portion 70 are longitudinally connected at a border of those substantially in a flat-surface manner.

The rear-seat center console portion 70 comprises, in other words, a rear-seat center console rear-portion 72 which is located above the rear-seat cushion panel 131 and a rear-seat center console front-portion 73 which extends forward before the kick-up portion 12. Further, the rear-seat center console front-portion 73 is provided with an upper portion 74 which has the second battery case 44 therein like the rear-seat center console rear-portion 72 and a lower portion 75 which is arranged just below the upper portion 74 and the second battery case 44 and does not have the second battery case 44 therein.

Herein, the top face portion 711 and the right-and-left side face portions 712 (the left-side one is only illustrated) of the rear-seat center console portion 70 are configured to extend between the rear-seat center console rear-portion 72 and the rear-seat center console front-portion 73 (the upper portion 74 and the lower portion 75).

Further, at the lower portion 75 without the second battery case 44 therein is formed an opening portion 76 (penetration hole) which penetrates in the vehicle width direction. This opening portion 76 provides the ventilating performance, in the vehicle width direction, of a foot space of the rear-seat passengers and also constitutes an exterior design which can provide the rear-seat passenger with a feeling of release.

That is, providing the opening portion 76 at the level corresponding to the rear-seat passenger's foot can properly improve the comfortableness of the rear-seat passenger without providing the passenger with a feeling of being oppressed, maintaining independence of each of the rear seats 30, 31 which is obtained by partitioning the right-and-left rear seats 30, 31 by the rear-seat center console portion 70.

Decorative panels (not illustrated) are provided at respective inner surfaces, i.e., an upper-side inner surface, a lower-side inner surface, a front-side inner surface, and a rear-side inner surface of the opening portion 76 which is formed in a cylindrical shape extending in the vehicle width direction, at the lower portion 75, thereby ensuring an exterior design of the inner surfaces of the opening portion 76.

The size, forming position, number and the like of the opening portion 76 are not limited to the present embodiment. For example, while the opening portion 76 of the present embodiment is provided at a central portion of the lower portion 75 in the elevational view (i.e., in the side view of the vehicle V), at least one of peripheral edges of a front edge, a rear edge, a lower edge and the like of the opening portion 76 may not be provided, the opening portion 76 may be formed at an entire part of the lower portion 75, or the plurality may be arranged at the lower portion 75. Furthermore, the opening portion 76 may be provided between the upper portion 74 and the lower portion 75 which are separated from each other in the vertical direction.

In addition, the thickness, in the vehicle width direction, of the lower portion 75 is not limited to that which corresponds to the second battery case 44, and the right-and-left side face portions 712 (the left-side one is illustrated only) which forms the lower portion 75 may be arranged such that the distance, in the vehicle width direction, of the right-and-left side face portions 712 is narrower than the width, in the vehicle width direction, of the second battery case 44.

(Top Face Portion 711 of Rear-Seat Center Console Portion 70)

As shown in FIGS. 1, 5 and 7, the top face portion 711 of the rear-seat center console portion 70 is provided with a shallow tray 77 which can receive an object, such as a mobile terminal, and a protrusion portion 80 which protrudes upward in front of the tray 77.

As shown in FIG. 5, the tray 77 comprises a bottom face portion 78*a* which is horizontal in the vehicle width direction and right-and-left vertical wall portions 79 which rises from right-and-left both edges of the bottom face portion 78 and extend continuously at the same level along its side edges extending in the longitudinal direction, which is configured in a recess shape such that its lateral cross section opens upward.

As shown in FIG. 8, the tray 77 extends in the longitudinal direction as a placement portion where the middle seatback portion 32 forward folded is placed, having its longitudinal length which corresponds to the longitudinal length of the middle seatback portion 32 forward folded and having it lateral width which is substantially the same as the lateral width of the middle seatback portion 32 forward folded.

The protrusion portion 80 protrudes upward beyond the upper ends of the right-and-left vertical wall portions 79 of the tray 77. An upper face portion of the protrusion portion 80 comprises a protrusion upper-face rear portion 81 which extends forward from a front end of the tray 77 and is inclined such that its front side is located at a higher level and a protrusion upper-face front portion 82 which extends forward from a front end of the protrusion upper-face rear portion 81 and is slightly inclined such that its front side is located at a lower level.

Specifically, as shown in FIG. 5, the bottom face portion 78 of the tray 77 is configured to be horizontal except its front-side part, and the front-side part of the bottom face portion 78 is configured to be inclined such that its front side is located at a higher level which corresponds to the level of the vertical wall portion 79. The protrusion upper-face rear portion 81 of the protrusion portion 80 is configured to extend obliquely forward-and-upward from a front end of the front-side part of the bottom face portion 78 of the tray 77 in such a manner that this protrusion upper-face rear portion 81 faces the rear-seat passenger in the side view of the vehicle V.

Further, the protrusion upper-face rear portion 81 of the protrusion portion 80 is located at a position where the rear-seat passenger's hand can reach, and this portion 81 serves as a function panel face which provides at least one of an input function and an output function for the rear-seat passenger's input/output operation of various kinds of information.

Specifically, the output function is a display (indication portion) or a sound output portion, such as a speaker. In a case where the output function is the display, the function panel face is arranged so that a whole part of an image indicated on the display can be captured (viewed) by the rear-seat passenger.

The display is a device to project the image by light emitting of a screen, and a liquid crystal display, an organic EL display or the like are applicable. The display may comprise a tach panel which is operable through a touching operation by the passenger.

The input function is an operation input portion to operate various kinds of vehicle onboard electric device, such as an audio device or a rear-seat heater, or a socket (connection terminal). The operation input portion includes a pushing button, a dial, a dial, a joystick or the like, and the socket incudes a USB socket, an AC socket, and a DC socket, but their arrangement number or kinds are not limited in particular.

In the present embodiment, as shown in FIG. 5, operation input portions 83 of the audio device, the rear-seat heater, and the like, two USB socket 84, and an AC sockets 85 are provided at the protrusion upper-face portion 81 as the function panel face.

Further, as shown in FIG. 8, the protrusion upper-face portion 81 of the protrusion portion 80 rises along a shape, in the side view of the vehicle V, of a front portion of the middle seatback portion 32 forward folded, having substantially the same height as the thickness, in the vertical direction, of the front portion of the middle seatback portion 32 forward folded at the top face portion 711 of the rear-seat center console portion 70.

The top face portion 711 of the rear-seat center console portion 70 of the present embodiment smoothly rises upward from the front part of the bottom face portion 78 of the tray 77 toward the protrusion upper-face rear portion 81. Thereby, as shown in FIG. 8, the front portion of the middle seatback portion 32 forward folded faces the protrusion upper-face rear portion 81 of the protrusion portion 80 from behind, thereby protecting the protrusion upper-face rear portion 81 against an outer factor, such as an outer force.

Further, as described above, the middle seatback portion 32 positioned in the forward-folded state is supported substantially horizontally at least by the tray 77 at the top face portion 711 of the rear-seat center console portion 70, and the back face portion 32*u* of the middle seatback portion 32 forms the flat surface, in the vehicle width direction, together with the back face portions 30Bu, 31Bu of the seatbacks 30B, 31B of the right-and-left rear seats 30, 31 forward folded (see FIG. 4) and also forms the flat surface, in the longitudinal direction, together with the upper face portion 43*u* of the first battery case 43 (see FIGS. 4 and 8).

As shown in FIGS. 1, 5, 6 and 8, the protrusion upper-face front portion 82 of the protrusion portion 80 is configured to be slightly inclined such that its front end is located at a position nearly below a lower edge of the rear-seat discharge portion 60, i.e., at a lower edge of the rear face portion 513 and its rear end is located at a front end of the protrusion upper-face rear portion 81. Thereby, wind (conditioning air) discharged from the rear-seat discharge portion 60 can be made to flow toward the rear-seat passenger without being hindered by the protrusion portion 80.

Moreover, as shown in FIGS. 4 and 8, the protrusion upper-face front portion 82 of the protrusion portion 80 is provided to form a substantially flat surface, in the longitudinal direction, together with the back face 32*u* of the middle seatback portion 32 forward folded. Thereby, the protrusion upper-face front portion 82 of the protrusion portion 80 can be configured to be part of the above-described flat and enlarged baggage-compartment floor surface 2Fa.

As shown in FIG. 1, the cabin structure of the vehicle V of the present embodiment is provided with the floor panel 1 (floor) forming the floor surface of the cabin 2, the seat cushions 30C, 31C of the right-and-left rear seats 30, 31 arranged to be laterally separated above the floor panel 1, the seatbacks 30B, 31B of the rear seats 30, 31 which are arranged to be laterally separated and independently forward foldable onto the seat cushions 30C, 31C, and the first battery case 43 arranged above the baggage-compartment floor panel 132 forming the floor surface (bottom face) of the baggage compartment 2*a* of the floor panel 1 which is located behind the seat cushions 30C, 31C. Further, as shown in FIG. 2, this cabin structure of the vehicle V comprises the second battery case 44 arranged between the right-and-left seat cushions 30C, 31C above the floor panel 1, the rear-seat center console portion 70 (console) covering over the upper face portion 44*u* and the right-and-left side face portions of the second battery case 44, and, as shown in FIGS. 4 and 8, and the middle seatback portion 32 which are arranged between the seatbacks 30B, 31B of the right-and-left rear seats 30, 31 and pivotally supported at its lower portion so as to forward folded toward the rear-seat center console portion 70. Moreover, as shown in FIG. 7, the longitudinal thickness (L32) of the middle seatback portion 32 positioned in the upright position is configured to be smaller than that (L30B, for example) of each of the seatbacks 30B, 31B of the right-and-left rear seats 30, 31 positioned in the upright position, as shown in FIGS. 4 and 8, the front end portion 43*f* of the first battery case 43 is positioned close to the rear end portions 30Br, 31Br of the seatbacks 30B, 31B of the rear seats 30, 31 which are positioned in the forward-folded state, the respective back face portions 30Bu, 31Bu, 32*u* of the seatbacks 30B, 31B and the middle seatback portion 32 which are positioned in the forward-folded state form the flat surface extending in the vehicle width direction, and also form the enlarged baggage-compartment floor surface 2Fa together with the upper face portion 43*u* of the first battery case 43.

According to this structure, the height (level) of the flat and enlarged baggage-compartment floor surface 2Fa which is formed by the seatbacks 30B, 31B of the rear seats 30, 31 and the middle seatback portion 32 which are all forward folded can be properly low and also the floor area of the baggage compartment 2*a* can be properly enlarged, ensuring the sufficient battery volume.

Specifically, since not only the first battery case 43 but the second battery case 44 arranged between the right-and-left seat cushions 30C1, 31C1 are provided above the floor panel 1, the sufficient battery volume can be ensured.

Further, as shown in FIG. 8, since the front end portion 43*f* of the first battery case 43 is provided close to the rear end portions 30Br, 31Br of the seatbacks 30B, 31B of the rear seats 30, 31 which are positioned in the forward-folded state and also the second battery case 44 is arranged between the right-and-left seat cushions 30C, 31C, the substantially-flat and enlarged baggage-compartment surface 2Fa can be formed in a state where the seatbacks 30B, 31B of the rear seats 30, 31 and the middle seatback portion 32 are all forward folded.

Moreover, since the second battery case 44 arranged above the floor panel 1 is provided between the seat cushions 30C, 31C of the rear seats 30, 31 as described above, the height (level) of the back face portions 30Bu, 31Bu of the seatbacks 30B, 31B forward folded can be made properly low compared to a case where this battery case 44 is arranged below the seat cushions 30C, 31C of the rear seats 30, 31, for example.

Meanwhile, since the longitudinal thickness of the middle seatback portion 32 positioned in the upright state is set to be smaller than that of the seatbacks 30B, 31B of the rear seats 30, 31 positioned in the upright state (L32<L30B (see FIG. 7)), the height between the rear seats 30, 31 when the middle seatback portion 32 is forward folded can be made properly low.

Accordingly, without improperly reducing the battery volume, the height (level) of the flat and enlarged baggage-compartment floor surface 2Fa when the seatbacks 30B, 31B of the rear seats 30, 31 and the middle seatback portion 32 are all forward folded can be properly low and the floor area of the baggage compartment 2*a* can be properly enlarged.

In the present embodiment, as shown in FIG. 2, the floor panel 1 comprises the front floor panel 11 having the tunnel portion 22 extending in the longitudinal direction, the kick-up portion 12 rising from the rear end portion of the front floor panel 11, and the rear-seat cushion panel 131 extending rearward from the upper end portion of the kick-up portion 12, where the seat cushions 30C, 31C of the rear seats 30, 31 are placed. The second battery case 44 is arranged above the rear-seat cushion panel 131 and extends forward beyond the kick-up portion 12 at the position above the tunnel portion 22.

According to this structure, since the second battery case 44 is arranged to extend forward beyond the kick-up portion 12, the height between the seat cushions 30C, 31C of the rear seats 30, 31 can be made properly low, ensuring the sufficient battery volume.

In the present embodiment, as shown in FIG. 5, at the top face portion 711 of the rear-seat center console portion 70 are provided the tray 77 as the placement portion for the middle seatback portion 32 forward folded and extending in the longitudinal direction and the protrusion portion 80 protruding beyond the tray 77 at the position in front of the tray 77. Further, the function (panel) face rising along the shape, in the side view of the vehicle V, of the front portion of the middle seatback portion 32 forward folded at the top face portion 711 of the rear-seat center console portion 70 is provided at the face of the protrusion portion 80 which faces the rear-seat passenger, i.e., at the protrusion upper-face rear portion 81.

According to this structure, as shown in FIG. 5, since the front portion of the middle seatback portion 32 forward folded come to be close to or substantially contact the protrusion upper-face rear portion 81 as the function (panel) face from behind, the function (panel) face of the rear-seat center console portion 70 can be protected by this front portion of the middle seatback portion 32. Further, the tray 77 can firmly support the middle seatback portion 32 which is forward folded and placed on the tray 77.

In the present embodiment, as shown in FIG. 8, the protrusion portion 80 and the middle seatback portion 32 are configured such that the protrusion upper-face front portion 82 and the back face portion 32*u* of the forward-folded middle seatback portion 32 form the substantially flat surface in the longitudinal direction. According to this structure, there occurs substantially no step (no level difference) between the protrusion upper-face front portion 82 and the back face portion 32*u*, thereby contributing to forming the flat floor surface of the baggage compartment 2*a*.

Another embodiment of the present invention will be described referring to the drawings.

Herein, this embodiment has the structure recited in Claim 1 of the present invention as well as the above-described embodiment, and therefore its specific illustration and description will be omitted here.

The vehicle of this embodiment is an electromotive vehicle which uses a drive force of an output of a motor, in which part of a battery to supply an electric power to the motor is disposed in a cabin R. A cabin structure of this kind of electromotive vehicle 201 will be described referring to FIGS. 14-19.

Figure 14:
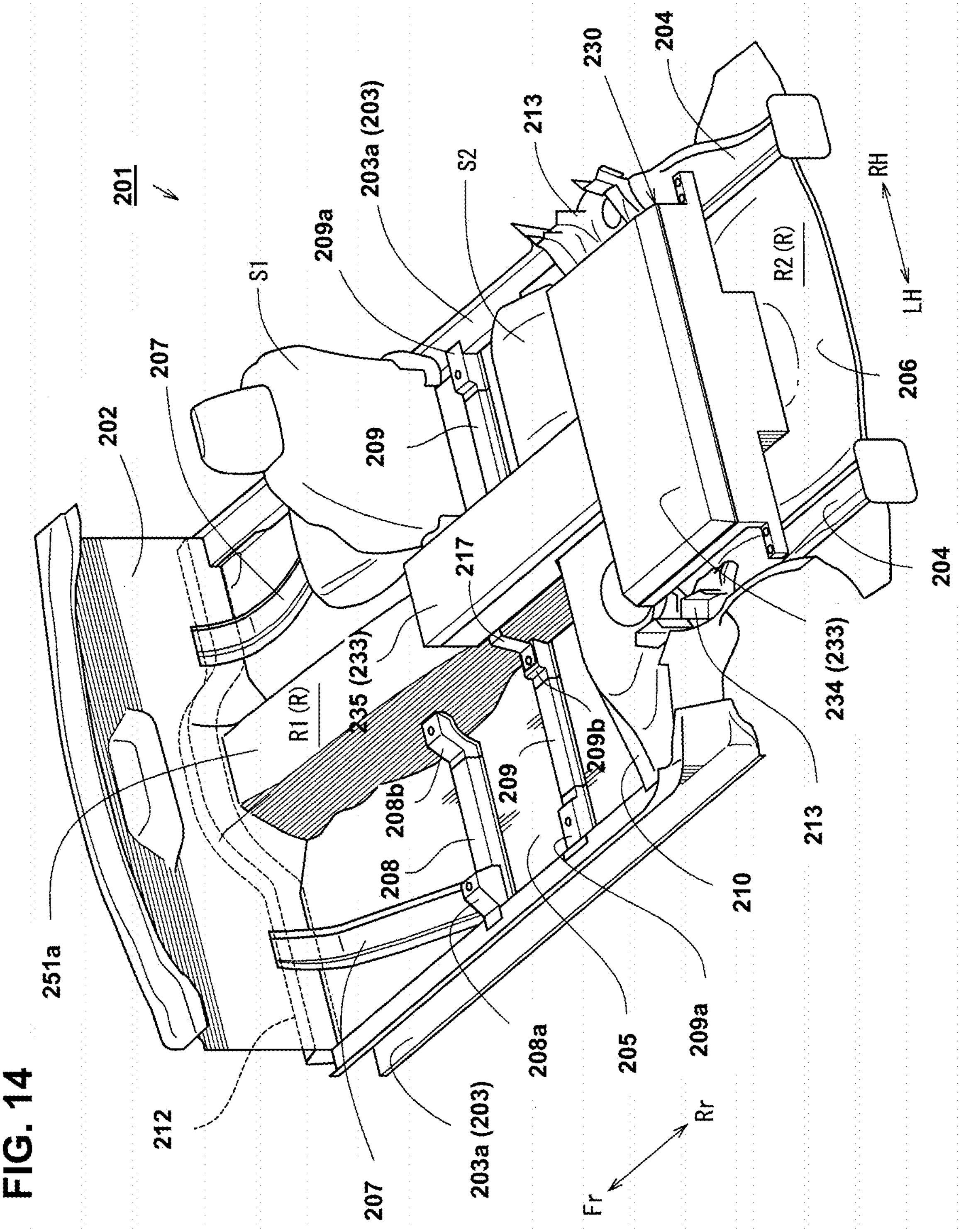
FIG. 14 is an exterior perspective view showing an exterior of a cabin of an electromotive vehicle, when viewed from the rear side of the vehicle, according to another embodiment.
Figure 15:
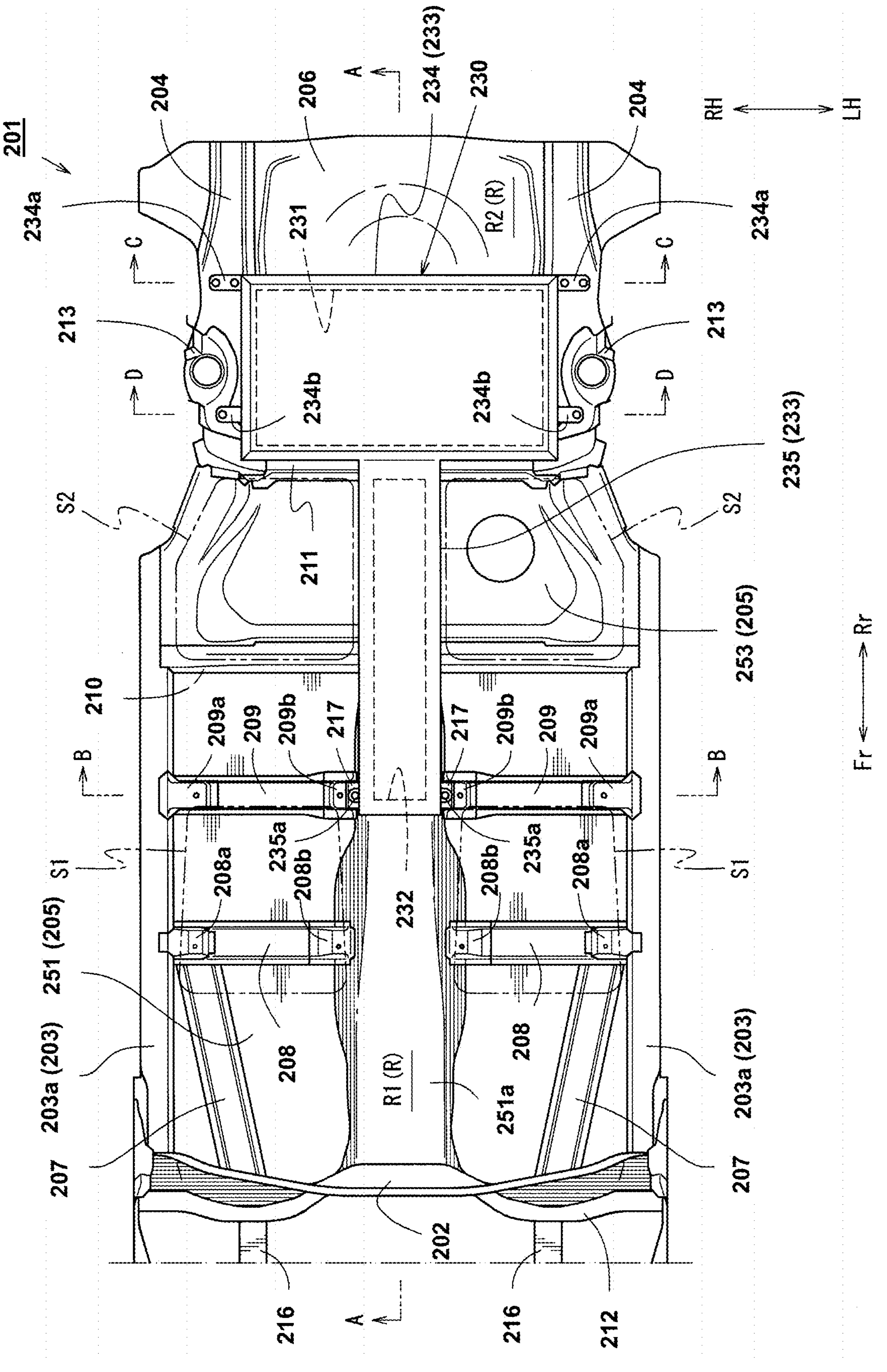
FIG. 15 is a plan view showing the exterior of the cabin of the electromotive vehicle.
Figure 16:
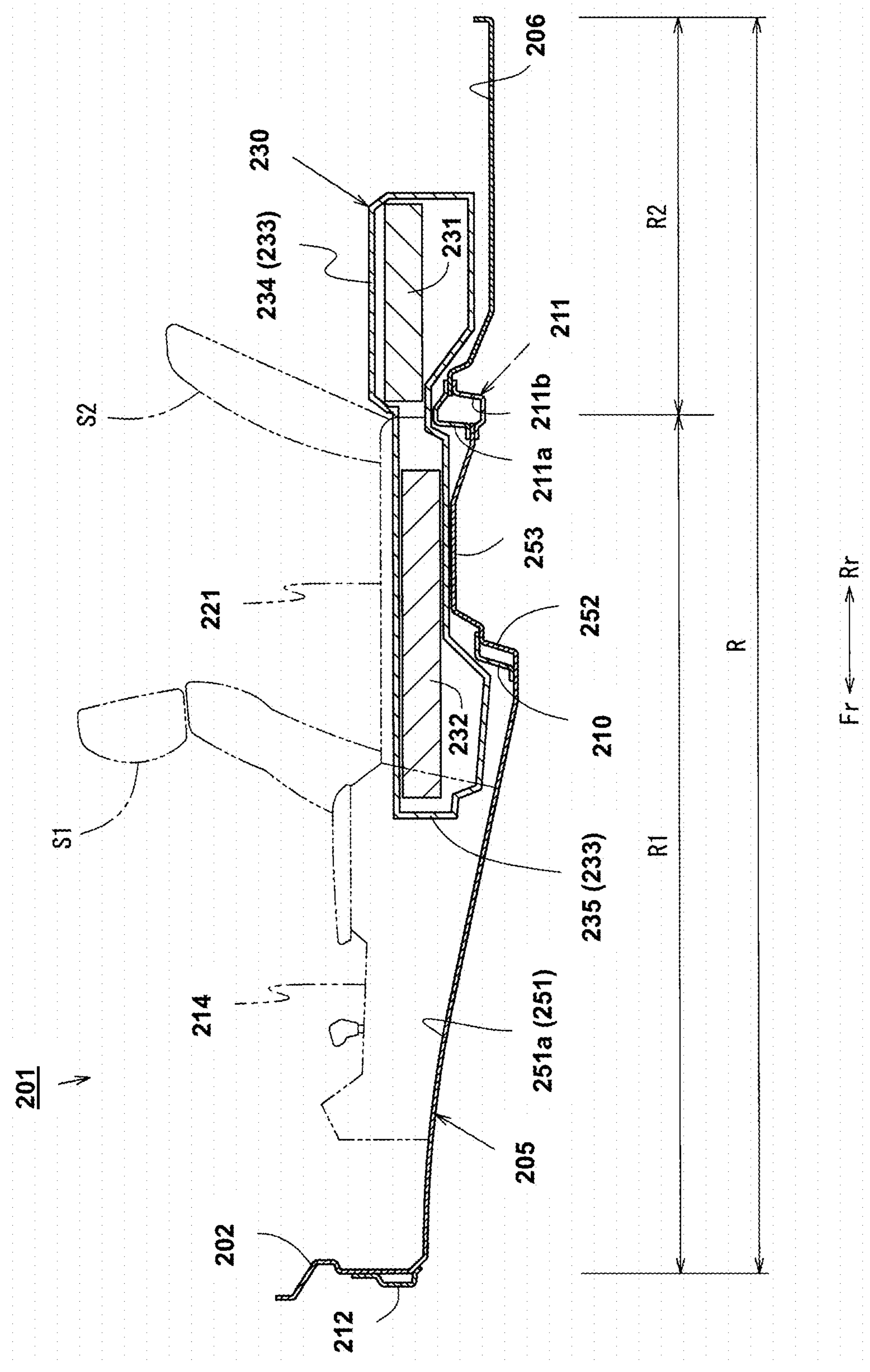
FIG. 16 is a sectional view taken along line A-A of FIG. 15.
Figure 17:
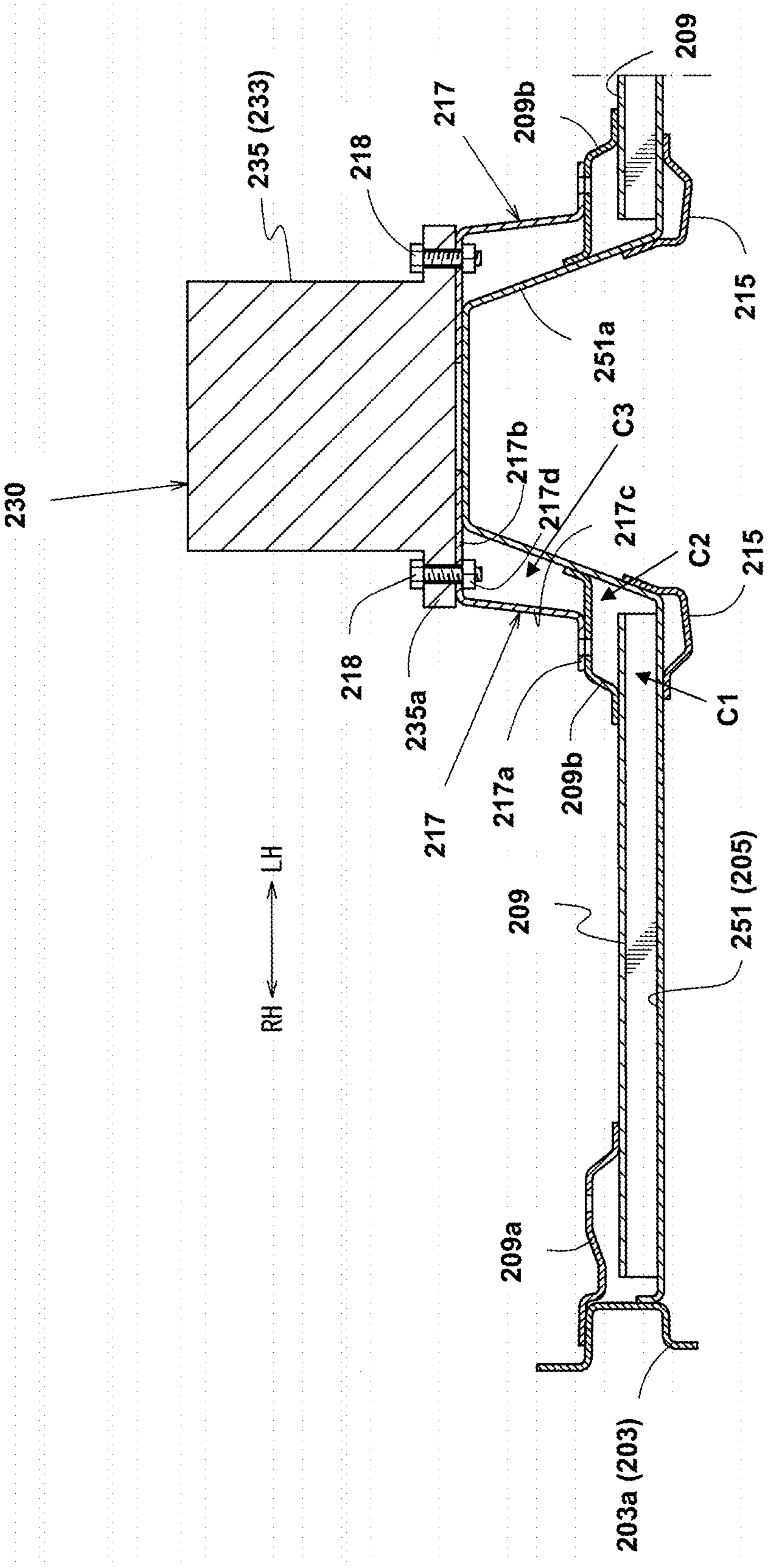
FIG. 17 is a sectional view taken along line B-B of FIG. 15.
Figure 18:
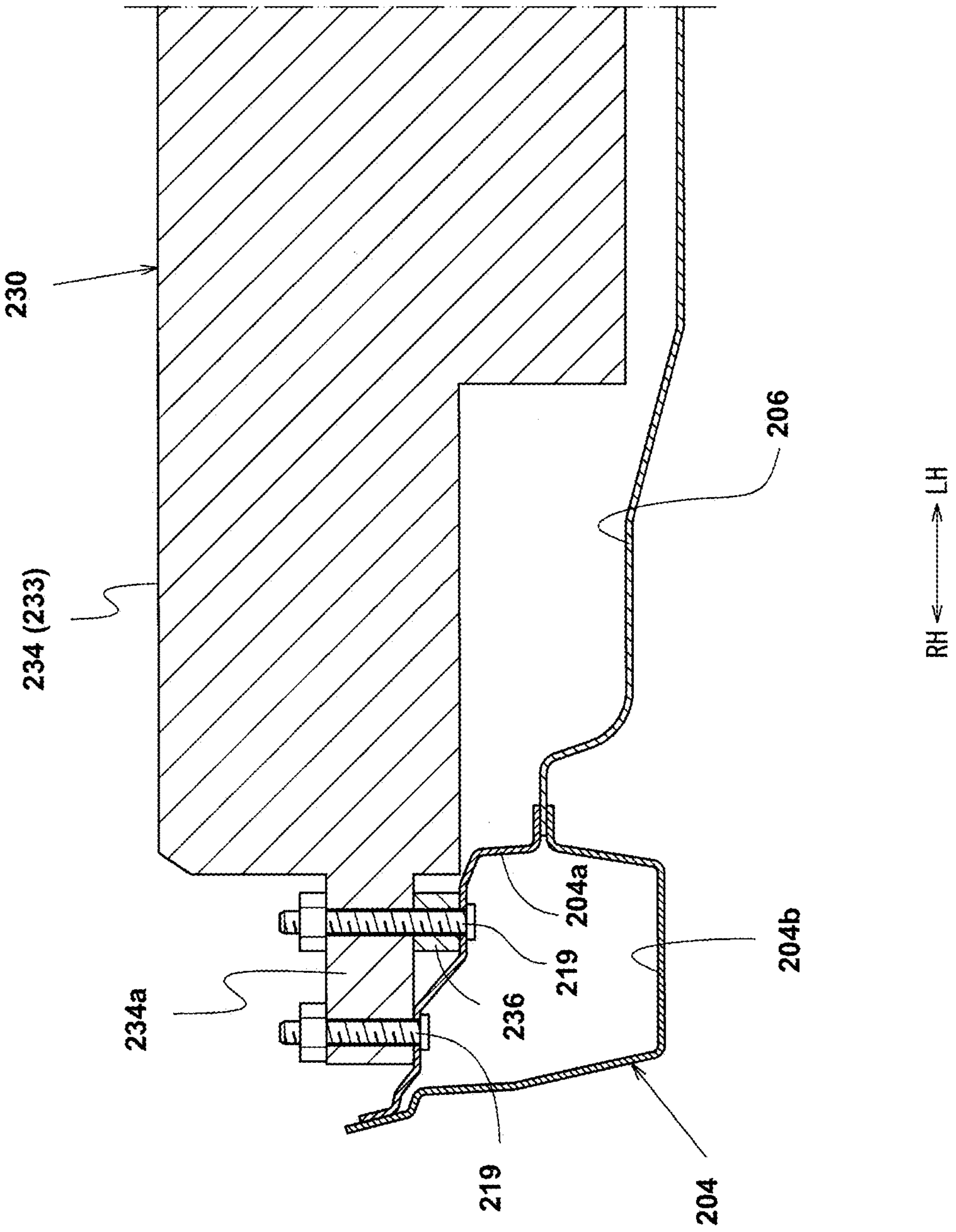
FIG. 18 is a sectional view taken along line C-C of FIG. 15.
Figure 19:
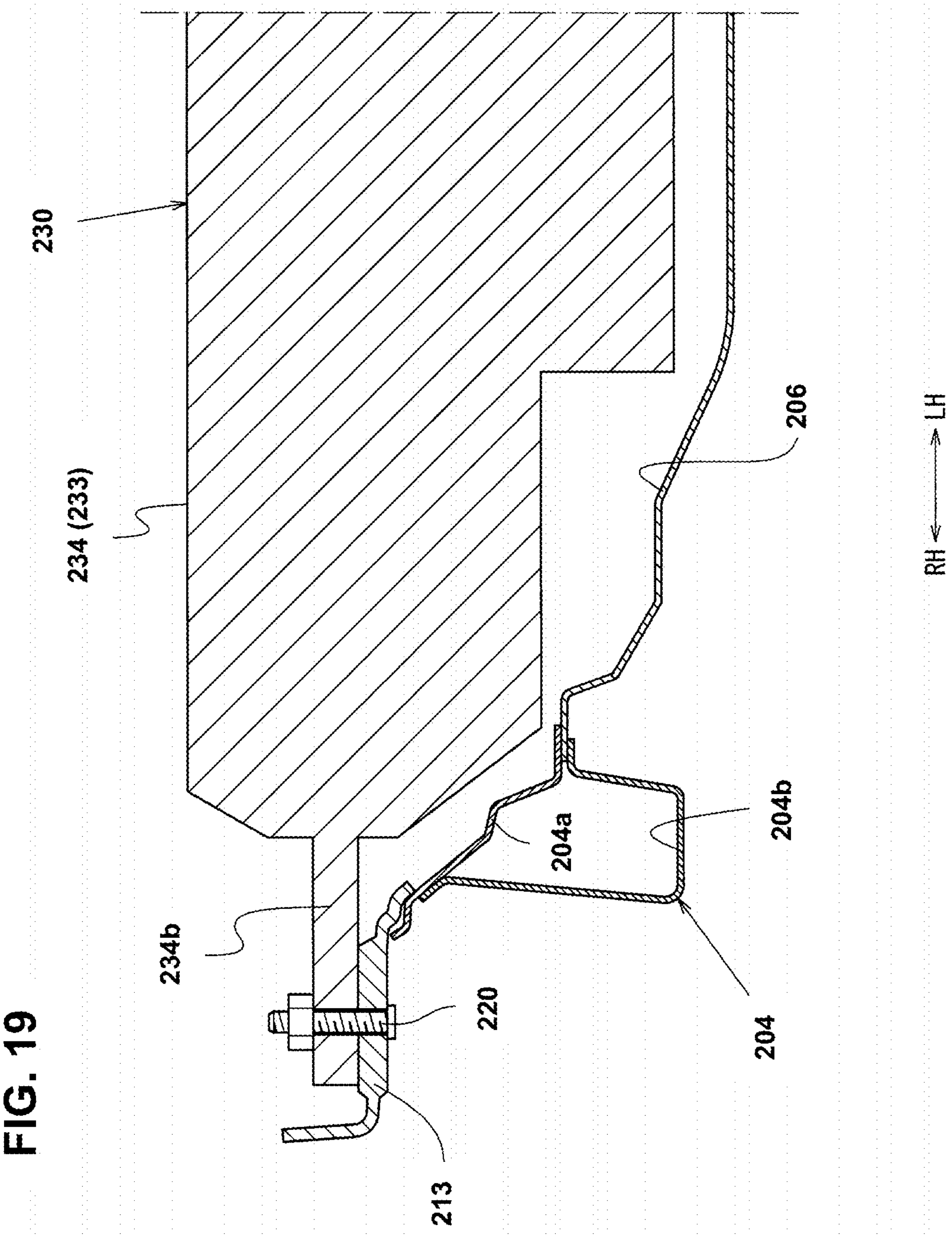
FIG. 19 is a sectional view taken along line D-D of FIG. 15.

FIG. 14 is an exterior perspective view showing an exterior of the cabin R of the electromotive vehicle 201, when viewed from the rear side of the vehicle, FIG. 15 is a plan view showing the exterior of the cabin R of the electromotive vehicle 201, FIG. 16 is a sectional view taken along line A-A of FIG. 15, and FIG. 17 is a sectional view taken along line B-B of FIG. 15. Further, FIG. 18 is a sectional view taken along line C-C of FIG. 15 and FIG. 19 is a sectional view taken along line D-D of FIG. 15.

Herein, in order to clarify illustration in FIG. 14, a left-side one of right-and-left front seats S1 and a left-side one of right-and-left rear seats S2 are not illustrated. Likewise, a right-side part of the vehicle is illustrated only in FIGS. 17-19 for the same reason.

In the figures, an arrow Fr and an arrow Rr show the longitudinal direction, the arrow Fr shows a front (forward) direction, and the arrow Rr shows a rear (rearward) direction. Further, an arrow Rh and an arrow Lh show the vehicle width direction, the arrow Rh shows a right (rightward) direction, and the arrow Lh shows a left (leftward) direction.

As shown in FIGS. 14 and 15, the electromotive vehicle 201 of the present embodiment comprises the cabin R which is composed of a passenger compartment R1 where a pair of right-and-left front seats S1 and a pair of right-and-left rear seats S2 for seating of passengers are arranged and a baggage compartment R2 which is positioned behind the passenger compartment R1 where baggage and the like are loaded.

This electromotive vehicle 201 comprises, as shown in FIGS. 14 and 15, a dash panel 202 which forms a front wall of the cabin R, a pair of right-and-left side sills 203 which extend rearward from respective lower portions of both ends, in the vehicle width direction, of the dash panel 202, and a pair of right-and-left rear side frames 204 which are connected to respective rear portions of the side sills 203 and extend rearward.

The electromotive vehicle 201 further comprises a front floor panel 205 which forms a floor surface of the passenger compartment R1 between the side sills 203, a rear floor panel 206 which forms a floor surface of the baggage compartment R2 between the rear side frames 204, and a pair of right-and-left floor frame uppers 207 which extend in the vehicle longitudinal direction from the dash panel 202 to the front floor panel 205.

In addition, this electromotive vehicle 201 has, as shown in FIGS. 15 and 16, a pair of right-and-left first floor cross members 208, a pair of right-and-left second floor cross members 209, and a pair of right-and-left third floor cross members 210, which all interconnect the right-and-left side sills 203 in the vehicle width direction, and a fourth floor cross member 211 which interconnects the right-and-left rear side frames 204 in the vehicle width direction.

Subsequently, respective elements of the electromotive vehicle 201 will be described further specifically. As shown in FIG. 14, the dash panel 202 is a panel member with a specific thickness in the vehicle longitudinal direction, which is configured such that a central portion, in the vehicle width direction, of its lower end protrudes upward.

Herein, both ends, in the vehicle width direction, of the dash panel 202 are connected to hinge pillars (not illustrated) which are provided to stand at respective front ends of the right-and-left side sills 203. A dash cross member 212 which extends in the vehicle width direction along the lower end of the dash panel 202 and are connected to the hinge pillars (not illustrated) is joined to a front face of the dash panel 202 as shown in FIGS. 14 and 16.

The dash cross member 212 is a vehicle-body frame member with a cross section which forms a closed-cross section with the dash panel 202. The cross section of the dash cross member 212 is of a roughly hat shape protruding in the vehicle front direction.

Each of the right-and-left side sills 203 is another vehicle-body frame member with a closed-cross section, which is formed by a side sill inner 203*a* which is positioned on an inward side, in the vehicle width direction, thereof and a side sill outer (not illustrated) which is positioned on an outward side, in the vehicle width direction, thereof as shown in FIG. 14.

Each of the right-and-left rear side frames 204 is further another vehicle-body frame member with a closed-cross section, a front end portion of which is joined to an inward side, in the vehicle width direction, of a rear part of the side sill 203, This rear side frame 204 is formed by a side frame upper 204*a* which is positioned at an upper side (see FIG. 18) and a side frame lower 204*b* which is positioned at a lower side (see FIG. 18).

Further, as shown in FIGS. 14 and 15, a damper support member 213 to support an upper end of a rear suspension damper (not illustrated) is joined to the side frame upper 204*a* of the rear side frame 204 at a position in back of the fourth floor cross member 211 described later.

This damper support member 213, which is a high-rigidity member which is made of aluminum diecast, for example, is joined to a rear side panel (not illustrated) which forms an inner wall of the baggage compartment R2, the side frame upper 204*a*, and the fourth floor cross member 211 described later, thereby serving as a vehicle-body frame member. Herein, a rear wheel (not illustrated) to be suspended by the rear suspension damper is disposed below the damper support member 213.

As shown in FIGS. 15 and 16, the front floor panel 205 is formed by a plate-shaped floor-panel front portion 251 which is joined to a lower end of the dash panel 202, a kick-up portion 252 which rises upward from a rear end of the floor-panel front portion 251, and a floor-panel rear portion 253 which extends rearward from an upper end of the kick-up portion 252.

More specifically, as shown in FIG. 15, the floor-panel front portion 251 forms a floor surface of the passenger compartment R1 over a range, in the vehicle longitudinal direction, from the lower end of the dash panel 202 to a front end of the rear seat S2.

Further, as shown in FIGS. 14-16, a tunnel portion 251*a* which protrudes upward with its longitudinal length extending from the dash panel 202 to the kick-up portion is formed substantially at a central portion, in the vehicle width direction, of the floor-panel front portion 251.

As shown in FIG. 17, the tunnel portion 251*a* is configured to have a roughly trapezoid-shaped cross section, and some devices, such as the shift lever, are fixed to its upper face. Herein, a font-seat center console 214 is fixedly arranged at a position adjacent, in the vehicle width direction, to the right-and-left front seats S1 as shown by a two-dotted broken line in FIG. 16.

Moreover, as shown in FIG. 17, a pair of right-and-left tunnel frames 215 which extend in the vehicle longitudinal direction along both-side lower ends of the tunnel portion 251*a* are joined to a lower face of the floor-panel front portion 251. Each of these tunnel frames 215 is another vehicle-body frame member which forms a closed-cross section with the floor-panel front portion 251, and its front end is connected to the dash cross member 212.

The kick-up portion 252 extends obliquely upward-and-rearward from a rear end of the floor-panel front portion 251 as shown in FIG. 16. The floor-panel rear portion 253 extends, from an upper end of the kick-up portion 252, rearward and then obliquely rearward-and-downward as shown in FIG. 16.

As shown by a two-dotted broken line in FIG. 15, a pair of sitting face portions (no reference number attached) for the rear seats S2 are fixedly placed onto the floor-panel rear portion 253 at both-side positions which are separated from each other in the vehicle width direction, interposing the central portion, in the vehicle width direction, of the floor-panel rear portion 253.

The rear floor panel 205 is a panel member which is configured to be recessed downwardly at its central portion, in the vehicle longitudinal direction and in the vehicle width direction, thereof, and as shown in FIG. 16, its front end is connected to a rear end of the front floor panel 205 via the fourth cross member 211 described later.

As shown in FIGS. 14 and 15, each of the right-and-left floor frame uppers 207 is obliquely arranged between the side sill 203 and the tunnel portion 251*a* of the front floor panel 205 inside the cabin R such that its rear end is positioned on the outward side, in the vehicle width direction, of its front end.

Specifically, as shown in FIG. 15, the floor frame upper 207 is arranged along an imaginary-straight line (not illustrated) which connects a rear end of the front side frame 216 extending forward from the dash panel 202 and an outward side, in the vehicle width direction, of the first floor cross member 208 described later.

This floor frame upper 207 is provided as another vehicle-body frame member which is joined o the dash panel 202 and the floor-panel front portion 251 and its cross section forms a closed-cross section together with the floor-panel front portion 251.

Further, a rear end portion of the floor frame upper 207 is joined to a front end portion of a floor frame lower (not illustrated) which is joined to the lower face of the floor-panel front portion 251, interposing the floor-panel front portion 251 therebetween. Herein, a rear end portion of the floor frame lower is connected to a front end portion of the rear side frame 204, for example.

The right-and-left first floor cross members 208 interconnect the right-and-left side sills 203 via the tunnel portion 251*a* of the front floor panel 205 at a central portion, in the vehicle longitudinal direction, of the floor-panel front portion 251.

Specifically, the first floor cross member 208, which is another vehicle-body frame member with its cross section which forms a closed-cross section together with the floor-panel front portion 251, is joined to an upper face of the floor-panel front portion 251.

Further, as shown in FIGS. 14 and 15, the first floor cross member 208 is connected to the side sill 203 via a first outside attachment portion 208*a* at an outward side, in the vehicle width direction, thereof, and its inward side is connected to the tunnel portion 251*a* via a first inside attachment portion 208*b*.

Herein, the first outside attachment portion 208*a* and the first inside attachment portion 208*b* are members where respective front portions of a pair of seat rails of the front seat S1 are fixedly fastened at a position below the upper face of the tunnel portion 251*a*.

More specifically, the first outside attachment portion 208*a* is formed in a substantially box shape which opens downward and outward, and its cross section forms a closed-cross section together with the side sill 203 and the first floor cross member 208.

Meanwhile, the first inside attachment portion 208*b* is formed in the substantially box shape which opens downward and inward, and its cross section forms a closed-cross section together with the tunnel portion 251*a* and the first floor cross member 208.

Further, as shown in FIG. 15, the right-and-left second floor cross members 209 interconnect the right-and-left side sills 203 via the tunnel portion 251*a* of the front floor panel 205 at a central portion, in the vehicle longitudinal direction, of the floor-panel front portion 251 between the first floor cross member 208 and the kick-up portion 252.

Specifically, the second floor cross member 209 is another vehicle-body frame member with its cross section which forms a closed-cross section C1 together with the floor-panel front portion 251, which is joined to the upper face of the floor-panel front portion 251.

As shown in FIGS. 14 and 15, the second floor cross member 209 is connected to the side sill 203 via a second outside attachment portion 209*a* at its outward side, and its inward side is connected to the tunnel portion 251*a* via a second inside attachment portion 209*b*.

Herein, the second outside attachment portion 209*a* and the second inside attachment portion 209*b* are members where respective rear portions of the front seat S1 are fixedly fastened at the position below the upper face of the tunnel portion 251*a*.

More specifically, the second outside attachment portion 209*a* is, as shown in FIG. 17, formed in a substantially box shape which opens downward and outward, and its cross section forms a closed-cross section together with the side sill 203 and the second floor cross member 209.

Meanwhile, the second inside attachment portion 209*b* is, as shown in FIG. 17, formed in the substantially box shape which opens downward and inward, and its cross section forms a closed-cross section C2 together with the tunnel portion 251*a* and the second floor cross member 209.

As shown in FIG. 17, a fastening bracket 217 which has a substantially crank-shaped cross section and where a battery unit 230 described later is fixedly fastened is joined to respective upper faces of the second inside attachment portions 209*b* of the right-and-left second floor cross members 209. This fastening bracket 217 forms a pair of right-and-left closed-cross sections C3 together with the tunnel portion 251*a* and the second inside attachment portions 209B as shown in FIG. 17, thereby forming a high-rigidity portion at the tunnel portion 251*a*.

Specifically, the fastening bracket 217 is, as shown in FIG. 17, integrally formed by a pair of flat-plate shaped lower base portions 217*a* which are joined to the upper faces of the second inside attachment portions 209*b*, a flat-plate shaped upper base portion 217*b* which is joined to the upper face of the tunnel portion 251*a*, and a pair of flat-plate shaped connection portions 217*c* which face both side faces of the tunnel portion 251*a* with a specified gap therebetween.

Further, at each of the upper base portions 217*b* of the fastening bracket 217 is formed a bolt insertion whole (no reference number attached) where a bolt 218 to be used for fixing of the battery 230 described later is inserted. A weld nut 217*d* to engage with the bolt 218 is joined to a lower face of each of the upper base portions 217*b*.

The third floor cross member 210 is another vehicle-body frame member with its cross section which forms a closed-cross section together with the front floor panel 205, and is joined to a rear end of the floor-panel front portion 251 and a front end of the floor-panel rear portion 253, straddling the kick-up portion 252 as shown in FIG. 16.

The fourth floor cross member 211 is arranged at a border of the floor-panel rear portion 253 and the rear floor panel 206 as shown in FIG. 16. This fourth floor cross member 211 is another vehicle-body frame member which has a closed-cross section, which is formed by a cross member upper 211*a* which is located at an upper side and a cross member lower 211*b* which is located at a lower side.

In the electromotive vehicle 201 provided with the above-described vehicle body, as shown in FIGS. 14-16, the battery unit 230 to supply the electric power to the motor is arranged over a range of the passenger R1 and the baggage compartment R2. This battery unit 230 comprises, as shown in FIGS. 15 and 16, a first battery 231 arranged in the baggage compartment R2, a second battery 232 arranged in the passenger compartment R1, and a battery case 233 storing and holding these batteries as a unit.

Specifically, the first battery 231 is configured to be relatively long in the vehicle width direction and roughly rectangular in the plan view, and provided at a front part of the rear floor panel 206 such that its rear side is positioned close to a seatback (no reference number attached) of the rear seat S2.

Meanwhile, as shown in FIG. 5, the second battery 232 is configured to be also roughly rectangular in the plan view but longer and narrower than the first battery 231, which is arranged between the right-and-left rear seats S2. Herein, these batteries 231, 232 are configured to be the lithium-ion battery or the like.

As shown in FIGS. 15 and 16, the battery case 233 is a high-rigidity case member which is made of the aluminum dicast, for example, which is formed in the roughly T-letter shape in the plan view by a case rear portion 234 to store and hold the first battery 231 and a case front portion 235 to store and hold the second battery 232.

This battery case 233 is formed by a plate-shaped lid portion (no reference number attached) which forms its upper face and a storage portion (no reference number attached) which has an upward open portion to be closed with the lid portion. The lid portion is fixedly fastened to the storage portion, and the storage portion is fixedly fastened to a high-rigidity portion of the vehicle body.

More specifically, as shown in FIG. 15, the case rear portion 234 is configured to have a roughly box shape with length, in the vehicle width direction, thereof extending from one of the rear side frames 204 to the other rear side frame 204 and length, in the longitudinal direction, thereof extending from the fourth floor cross member 211 to a central portion, in the vehicle longitudinal direction, of the rear floor panel 206.

The case rear portion 234 is, as shown in FIG. 15, provided with a pair of right-and-left first fixation portions 234*a* to be fixed to the rear side frames 204 behind the damper support members 213 and a pair of right-and-left second fixation portion 234*b* to be fixed to the damper support members 213.

Specifically, as shown in FIGS. 15 and 18, each of the right-and-left first fixation portions 234*a* has a flat-plate shape, which protrudes to the outward side, in the vehicle width direction, from a side face of a rear end portion of the case rear portion 234, and is fixedly fastened to two weld bolts 219 which are provided at the rear side frame 204 with a specified distance, in the vehicle width direction, therebetween. Herein, the first fixation portion 234*a* is fixed to the rear side frame 204 in a state where a spacer 236 is interposed between a lower face of its inward side and an upper face of the rear side frame 204.

Meanwhile, as shown in FIGS. 15 and 19, each of the right-and-left second fixation portions 234*b* has a flat-plate shape, which protrudes to the outward side, in the vehicle width direction, from a side face of a front end portion of the case rear portion 234, and is fixedly fastened to a single weld bolts 220 which are provided at the damper support member 213.

The case front portion 235 divides a foot space of the rear seats S2 in the vehicle width direction, and its front end is located inside the front-seat center console 214 as shown in FIGS. 15 and 16.

Specifically, the case front portion 235 has its longitudinal length extending from a front end of the case rear portion 234 to the second floor cross member 209, and is formed in a roughly box shape such that its upper face is located below an upper face of the case rear portion 234.

Herein, as shown by a two-dotted broken line in FIG. 16, the case front portion 235 is disposed between the right-and-left rear seats S2 and covered with the rear-seat center console 221 which extends rearward continuously from the front-seat center console 214.

The case front portion 235 is, as shown in FIG. 15, provided with a pair of right-and-left third fixation portions 235*a* to be fixed to a closed-cross section portion which is formed by the floor-panel front portion 251 and the second floor cross members 209 and the second inside attachment portions 209*b*.

Specifically, as shown in FIGS. 15 and 17, each of the right-and-left third fixation portions 235*a* has a flat-plate shape which protrudes to the outward side, in the vehicle width direction, from s side face of s front end portion of the case front portion 235, and is fixedly fastened to the fastening bracket 217 by the bolts 218.

As described above, the case rear portion 234 of the battery unit 230 interconnects, in the vehicle width direction, the high-rigidity portions (the right-and-left rear side frames 204 and the right-and-left damper support members 213) which are separated from each other in the vehicle longitudinal direction, interposing the rear suspension damper.

Further, the case front portion of the battery unit 230 connects the case rear portion 234 to the high-rigidity portion (the close-cross section portion C1 formed by the second floor cross member 209, the closed-cross section portion C3 formed by the fastening bracket 217, and the closed-cross section portion C2 formed by the second inside attachment portion 209*b*) which is positioned in front of the rear seat S2.

In other words, the electromotive vehicle 201 connects the right-and-left rear side frame 204 and the right-and-left damper support member 213 to the high-rigidity portion (the close-cross section portion C1 formed by the second floor cross member 209, the closed-cross section portion C3 formed by the fastening bracket 217, and the closed-cross section portion C2 formed by the second inside attachment portion 209*b*) which is positioned in front of the rear seat S2 via the battery unit 230.

As described above, the cabin structure of the electromotive vehicle 201 of the present embodiment comprises the front floor panel 205 which forms the floor surface of the passenger compartment R1 and the right-and-left rear seats S2 which are provided above the front floor panel 205 such that these seats S2 are separated from each other in the vehicle width direction and located at the rearmost position.

The cabin structure of the electromotive vehicle 201 further comprises the high-rigidity battery case 233 which store the first battery 231 positioned behind the rear seats S2 and the second battery 232 positioned between the rear seats S2.

This battery case 233 is integrally formed in the roughly T-letter shape in the plan view by the case rear portion 234 which extends from the outward side of one of the rear seats S2 to the outward side of the other rear seat S2 in the vehicle width direction and stores the first battery 231 and the case front portion 235 which extends forward from the case rear portion 234 through a space between the rear seats S2 and stores the second battery 232.

Further, the case rear portion 234 of the battery case 233 is fixed to a pair of high-rigidity portions of the vehicle body (the rear side frame 204 and the damper support members 213) which are positioned behind the rear seat S2.

Moreover, the case front portion 235 of the battery case 233 is fixed to the high-rigidity portions of the vehicle body (the closed-cross section portion C1 formed by the second floor cross member 209, the closed-cross section portion C3 formed by the fastening bracket 217, and the closed-cross section portion C2 formed by the second inside attachment portion 209*b*) which are positioned before the seatbacks of the rear seats S2.

According to this structure, the battery volume of the electromotive vehicle 201 can be ensured by the first and second batteries 231, 232 arranged in the cabin R. Herein, since these batteries 231, 232 are stored and held by the high-rigidity battery case 233, the present cabin structure of the electromotive vehicle 201 can protect these batteries 231, 232 from an unpredicted outer force.

Also, since the case rear portion 234 of the battery case 233 is fixed to the high-rigidity portions of the vehicle which are positioned behind the rear seats S2, the present cabin structure of the electromotive vehicle 201 can connect, in the vehicle width direction, portions which are close to load-input points of the vehicle body where an input load from the rear wheel is inputted by the case rear portion 234.

Additionally, since the case rear portion 234 is fixed to the high-rigidity portion of the vehicle body which is positioned before the seatbacks of the rear seats S2 via the case front portion 235, the cabin structure of the electromotive vehicle 201 can prevent that the case rear portion 234 has bending or torsion due to the input load from the rear wheel. Thereby, the cabin structure of the electromotive vehicle 201 can make the battery case 233 serve as the frame member to reinforce the vehicle body, so that the bending rigidity or the torsional rigidity of the vehicle body can be improved.

Moreover, the cabin structure of the electromotive vehicle 201 can suppress the vehicle's weight compared to a case where the portions of the vehicle body which are close to the load-input points are interconnected, in the vehicle width direction, by using a different connecting member from the battery case 233. Accordingly, the cabin structure of the electromotive vehicle 201 can compatibly attain ensuring the battery volume and improving the vehicle-body rigidity, suppressing the vehicle's weight increase.

Also, the cabin structure of the electromotive vehicle 201 has the rear floor panel 206 forming the floor surface of the baggage compartment R2 which is positioned on the rearward side of the front floor panel 205. The first battery 231 is arranged above the rear floor panel 206.

The case rear portion 234 of the battery case 233 is fixed to the high-rigidity portions (the rear side frame 204 and the damper support member 213) which are adjacent, in the vehicle width direction, to the rear floor panel 206.

According to this structure, the case rear portion 234 of the battery case 233 can be fixed closer to the right-and-left load-input points in the cabin R where the passenger compartment R1 and the baggage compartment R2 are integrally formed, for example. Thereby, the cabin structure of the electromotive vehicle 201 can securely make the battery case 233 serve as the frame member to reinforce the vehicle body, thereby improving the vehicle-body rigidity.

The cabin structure of the electromotive vehicle 201 further has the pair of right-and-left rear side frames 204 where the end portions, in the vehicle width direction, of the rear floor panel 206 are joined. The case rear portion 234 of the battery case 233 is fixed to the right-and-left rear side frames 204 at both end portions, in the vehicle width direction, thereof.

According to this structure, since the case rear portion 234 of the battery case 233 is fixed to the rear side frames 204 as an existing high-rigidity portion of the vehicle body, it is unnecessary to provide any other additional high-rigidity portion in the baggage compartment R2.

Further, since the rear side frames 204 where the input load easily acts are interconnected, in the vehicle width direction, by the case rear portion 234, the cabin structure of the electromotive vehicle 201 can securely suppress the vehicle body's torsion to be caused by the input load from the rear wheel by means of the battery case 233.

Also, the cabin structure of the electromotive vehicle 201 comprises the damper support member 213 which is positioned close to the outward side of the rear floor panel 206 and supports the upper end of the rear suspension damper. The case rear portion 234 of the battery case 233 is fixed to the damper support member 213 at the end portion, in the vehicle width direction, thereof.

According to this structure, since the case rear portion 234 of the battery case 233 is fixed to the damper support member 213 as the existing high-rigidity portion, any other additional high-rigidity portion is unnecessary in the baggage compartment R2. Moreover, since the damper support members 213 where the input load from the rear wheel directly acts is interconnected, in the vehicle width direction, by the case rear portion 234, the cabin structure of the electromotive vehicle 201 can suppress the vehicle body's torsion to be caused by the input load from the rear wheel by means of the battery case 233 more securely.

Meanwhile, the case front portion 235 of the battery case 233 extends through the space between the rear seats S2, and has the longitudinal length such that the foot space of the passenger seated in the rear seat S2 is divided, in the vehicle width direction, thereby. According to this structure, the battery volume can be ensured by utilizing the space between the rear seats S2, and the independent seat spaces can be formed by the case front portion 235 separating the right-and-left rear seats S2.

Further, by covering the case front portion 235 with the rear-seat center console 221, the cabin structure of the electromotive vehicle 201 can properly prevent deterioration of appearance between the right-and-left rear seats S2, which may be caused by the case front portion 235 of the battery case 233, and also improve the livability of the passenger and the high-quality feeling in the rear part of the passenger compartment R1.

The case front portion 235 of the battery case 233 is fixed to the second inside attachment portions 209*b* to attach the front seats S1. According to this structure, since the case front portion 235 of the battery case 233 is fixed to the second inside attachment portions 209*b* as the existing high-rigidity portions, it is unnecessary to provide any other additional high-rigidity portions in the passenger compartment R1. Accordingly, the cabin structure of the electromotive vehicle 201 can improve the vehicle-body rigidity without increasing the vehicle weight.

The cabin structure of the electromotive vehicle 201 further comprises the pair of right-and-left side sills 203 extending in the vehicle longitudinal direction and joined to the both-side end portions, in the vehicle width direction, of the front floor panel 205 and the second floor cross members 209 interconnecting the side sills 203 in the vehicle width direction and forming the closed-cross sections extending in the vehicle width direction together with the front floor panel 205.

The case front portion 235 of the battery case 233 is fixed to the closed-cross sections formed by the front floor panel 205 and the second floor cross members 209.

According to this structure, since the case front portion 235 of the battery case 233 is fixed to the closed-cross section portions as the existing high-rigidity portions, it is unnecessary to provide any other additional high-rigidity portions in the passenger compartment R1. Accordingly, the cabin structure of the electromotive vehicle 201 can improve the vehicle-body rigidity without increasing the vehicle weight.

Further, the front floor panel 205 comprises the tunnel portion 251*a* protruding upward and extending in the vehicle longitudinal direction at the central portion, in the vehicle width direction, thereof. Herein, the case front portion 235 of the battery case 233 is fixed to the high-rigidity portions (the closed-cross section portion C3 formed by the fastening bracket 217) which are arranged above the tunnel portion 251*a* and provided at the tunnel portion 251*a*.

According to this structure, even in a case where the front floor panel 205 is provided with the tunnel portion 251*a*, the case front portion 235 of the battery case 233 can be supported securely, thereby improving the vehicle-body rigidity securely.

What is claimed is:

1. A cabin structure of a vehicle, which is provided with a floor forming a bottom face of a cabin, right-and-left front seats arranged to be laterally separated above a front part of the floor, a front-seat center console interposed between the right-and-left front seats, right-and-left rear seats arranged to be laterally separated above a rear part of the floor behind a kick-up portion and configured to be forward foldable, and a rear-seat center console interposed between the right-and-left rear seats, comprising:

a first battery for drive provided above a baggage-compartment part of the floor behind seatbacks of the rear seats and extending in a vehicle width direction; and a second battery for drive provided above a part of the floor between the right-and-left rear seats and extending in a vehicle longitudinal direction, wherein said first and second batteries are arranged in a T-letter shape in a plan view, right-and-left both end portions of the first battery are fixed to the baggage-compartment part of the floor, a front end portion of the second battery extending forward beyond the kick-up portion toward an inside of the front-seat center console is fixed to the floor, and each back face portion of the respective seatbacks of the right-and-left rear seats which are positioned in a forward-folded state and an upper face portion of the first battery are configured to form a substantially flat and enlarged floor surface of a baggage compartment.

2. The cabin structure of the vehicle of claim 1, further comprising a middle seatback portion provided between said right-and-left rear seats so as to be forward folded onto an upper face of said rear-seat center console, wherein longitudinal thickness of said middle seatback portion in an upright position is configured to be smaller than that of each of the seatbacks of the right-and-left rear seats in the upright position such that a back face portion of the middle seatback portion positioned in a forward-folded state and each back face portion of the respective seatbacks of the right-and-left rear seats positioned in in the forward-folded state form a flat surface extending in the vehicle width direction.

3. The cabin structure of the vehicle of claim 2, wherein an upper portion of said rear-seat center console is provided with a seatback placement portion where the forward-folded middle seatback portion is received and a protrusion portion which is configured to protrude in front of said seatback placement portion, a function panel to provide an input/output function to a passenger seated in the rear seat is arranged at a portion of said protrusion portion which faces the passenger seated in the rear seat, and said function panel is covered with the middle seatback portion positioned in the forward-folded state.

4. The cabin structure of the vehicle of claim 1, wherein a rear portion of said front-seat center console and the front end portion of said second battery are fixed to a central portion, in the vehicle width direction, of the floor by a common attaching member.

5. The cabin structure of the vehicle of claim 4, wherein said front-seat center console comprises an object storage portion which opens upward and an air-conditioning discharge port for the rear seat which is arranged behind the object storage portion, the front end portion of said second battery is positioned close to a rear end portion of said object storage portion, and said air-conditioning discharge port is positioned above the front end portion of the second battery.

6. The cabin structure of the vehicle of claim 5, wherein a duct to introduce conditioning air from an air-conditioning unit provided at a front part of the cabin to said air-conditioning discharge port for the rear seat is arranged inside said front-seat center console, said object storage portion is formed in a cuboid shape with a bottom, which includes a bottom face portion and right-and-left side wall portions, and said duct is configured to extend from below the object storage portion to the air-conditioning discharge port for the rear seat, passing through a space between a side face portion of the front-seat center console and the side wall portion of the object storage portion.

7. The cabin structure of the vehicle of claim 1, wherein said first battery includes a first battery case which stores a battery pack as a first battery body, and said second battery includes a second battery case which stores a battery pack as a second battery body.

8. The cabin structure of the vehicle of claim 1, further comprising an aluminum-made battery case in which a case rear portion to store said first battery and a case front portion to store said second battery are integrally formed substantially in the T-letter shape in the plan view, wherein said case rear portion is fixed to a pair of right-and-left high-rigidity vehicle-body portions which are located in back of the right-and-left rear seats, and said case front portion is fixed to another pair of right-and-left high-rigidity vehicle-body portions which are located in front of the seatbacks of the right-and-left rear seats.

9. The cabin structure of the vehicle of claim 8, wherein both end portions, in the vehicle width direction, of said case rear portion of the battery case are fixed to right-and-left rear side frames of the vehicle.

10. The cabin structure of the vehicle of claim 8, further comprising right-and-left damper support portions to support respective upper ends of right-and-left rear-suspension dampers, wherein said both end portions, in the vehicle width direction, of the case rear portion of the battery case are fixed to said right-and-left damper support portions.

11. The cabin structure of the vehicle of claim 8, wherein the floor is provided with a floor tunnel protruding upward and extending in the vehicle longitudinal direction substantially at a center, in the vehicle width direction, of the floor, and a front end portion of said case front portion of the battery case is fixed to a high-rigidity portion of said floor tunnel.

* * * * *